United States Patent
Kasahara et al.

(10) Patent No.: US 10,460,022 B2
(45) Date of Patent: Oct. 29, 2019

(54) DISPLAY CONTROL DEVICE, DISPLAY CONTROL METHOD, AND PROGRAM FOR DISPLAYING AN ANNOTATION TOWARD A USER

(71) Applicant: SONY CORPORATION, Tokyo (JP)

(72) Inventors: Shunichi Kasahara, Kanagawa (JP); Junichi Rekimoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 214 days.

(21) Appl. No.: 15/025,753

(22) PCT Filed: Aug. 13, 2014

(86) PCT No.: PCT/JP2014/071387
§ 371 (c)(1),
(2) Date: Mar. 29, 2016

(87) PCT Pub. No.: WO2015/072195
PCT Pub. Date: May 21, 2015

(65) Prior Publication Data
US 2016/0239472 A1  Aug. 18, 2016

(30) Foreign Application Priority Data

Nov. 13, 2013 (JP) .................................. 2013-234933

(51) Int. Cl.
*G06T 11/60* (2006.01)
*G06F 17/24* (2006.01)
(Continued)

(52) U.S. Cl.
CPC ............ *G06F 17/241* (2013.01); *G06T 11/60* (2013.01); *G06T 19/006* (2013.01); *H04N 7/15* (2013.01)

(58) Field of Classification Search
CPC ..... G06F 17/241; G06T 11/60; G06T 19/006; H04N 7/15
See application file for complete search history.

(56) References Cited

U.S. PATENT DOCUMENTS 6,152,563 A * 11/2000 Hutchinson ............ A61B 3/113
351/209
7,015,951 B1 * 3/2006 Yoshigahara .......... G01C 11/06
348/135
(Continued)

FOREIGN PATENT DOCUMENTS

JP  2009-251428  10/2009
JP  2011-192048  9/2011
(Continued)

*Primary Examiner* — Maikhanh Nguyen
(74) *Attorney, Agent, or Firm* — Paratus Law Group, PLLC

(57) ABSTRACT

To be able to further facilitate interaction between users using AR technologies. Provided is a display control device including: a picture image acquiring unit configured to acquire a moving image corresponding to a sight of a first user in real time; a display control unit configured to display the moving image toward a second user different from the first user, and an annotation detection unit configured to detect that an annotation input by the second user with respect to the moving image is displayed in the sight of the first user or is output to be displayed. The display control unit further displays the displayed or output annotation toward the second user.

15 Claims, 16 Drawing Sheets

(51) Int. Cl.
*G06T 19/00* (2011.01)
*H04N 7/15* (2006.01)

(56) References Cited

U.S. PATENT DOCUMENTS

| | | | | |
|---|---|---|---|---|
| 7,119,814 B2* | 10/2006 | Meron | ............... | A61B 1/00009 345/619 |
| 7,396,129 B2* | 7/2008 | Endrikhovski | ......... | G06F 3/038 345/619 |
| 7,734,104 B2* | 6/2010 | Yamane | ............... | H04N 19/172 382/232 |
| 8,385,607 B2* | 2/2013 | Okada | ............... | G06K 9/00228 348/333.02 |
| 8,682,142 B1* | 3/2014 | Boskovitz | ............ | G11B 27/034 386/278 |
| 8,711,265 B2* | 4/2014 | Kawamura | ........ | H04N 1/00408 348/240.2 |
| 9,411,419 B2* | 8/2016 | Kasahara | ............... | G06F 3/0304 |
| 9,501,633 B2* | 11/2016 | Sako | ....................... | G06F 21/36 |
| 9,823,739 B2* | 11/2017 | Kasahara | ............... | G06F 3/011 |
| 10,049,497 B2* | 8/2018 | Kasahara | ................. | G06T 7/60 |
| 10,115,210 B2* | 10/2018 | Kasahara | ........... | G06K 9/00671 |
| 2002/0105482 A1* | 8/2002 | Lemelson | ............... | G06F 3/013 345/7 |
| 2002/0171669 A1* | 11/2002 | Meron | ............... | A61B 1/00009 345/619 |
| 2003/0038884 A1* | 2/2003 | Matsushita | ........ | H04N 1/32144 348/211.5 |
| 2004/0201735 A1* | 10/2004 | Baron | ................... | H04N 1/2112 348/231.2 |
| 2004/0212712 A1* | 10/2004 | Stavely | ................... | A61B 3/113 348/333.03 |
| 2006/0112334 A1* | 5/2006 | Endrikhovski | ......... | G06F 3/013 715/700 |
| 2007/0121720 A1* | 5/2007 | Yamane | ............... | H04N 19/172 375/240.08 |
| 2008/0062291 A1* | 3/2008 | Sako | .................. | G02B 27/0093 348/294 |
| 2008/0118156 A1* | 5/2008 | Okada | ............... | G06K 9/00228 382/195 |
| 2009/0268076 A1* | 10/2009 | Kawamura | ........ | H04N 1/00408 348/333.12 |
| 2010/0054692 A1* | 3/2010 | Naruse | .................. | G11B 27/034 386/278 |
| 2012/0299962 A1* | 11/2012 | White | .................. | G02B 27/017 345/633 |
| 2016/0054793 A1* | 2/2016 | Kasahara | ............... | G06F 3/0488 345/633 |
| 2016/0055675 A1* | 2/2016 | Kasahara | ............... | G06T 19/006 345/633 |
| 2016/0055676 A1* | 2/2016 | Kasahara | ............... | G06T 19/006 345/633 |

FOREIGN PATENT DOCUMENTS

| | | |
|---|---|---|
| JP | 2012-160898 | 8/2012 |
| JP | 2012-212345 | 11/2012 |

* cited by examiner

DISPLAY CONTROL DEVICE, DISPLAY CONTROL METHOD, AND PROGRAM FOR DISPLAYING AN ANNOTATION TOWARD A USER

CROSS REFERENCE TO PRIOR APPLICATION

This application is a National Stage Patent Application of PCT International Patent Application No. PCT/JP2014/071387 (filed on Aug. 13, 2014) under 35 U.S.C. § 371, which claims priority to Japanese Patent Application No. 2013-234933 (filed on Nov. 13, 2013), which are all hereby incorporated by reference in their entirety.

TECHNICAL FIELD

The present disclosure relates to a display control device, a display control method, and a program.

BACKGROUND ART

In recent years, technology known as augmented reality (AR) through which users are presented with additional information that is superimposed on the real world has been noticed. Information presented to users in AR technology, which is also called annotation, can be visualized using virtual objects of various forms such as text, icons, animation, and the like. For example, Patent Literature 1 discloses a technology for realizing manipulation of virtual objects of such AR without impairing immersion of users in an AR space.

CITATION LIST

Patent Literature

Patent Literature 1: JP 2012-212345A

SUMMARY OF INVENTION

Technical Problem

The AR technology proposed in Patent Literature 1 and the like was developed recently and it is difficult to say that the technologies for utilizing AR in various phases have been proposed sufficiently. For example, the number of technologies for facilitating interaction between users using AR technologies that have been proposed is still only one, and therefore insufficient.

It is desirable to provide a novel and improved image processing device, a novel and improved image processing method, and a novel and improved program capable of further facilitating interaction between users using AR technologies.

Solution to Problem

According to the present disclosure, there is provided a display control device including: a picture image acquiring unit configured to acquire a moving image corresponding to a sight of a first user in real time; a display control unit configured to display the moving image toward a second user different from the first user, and an annotation detection unit configured to detect that an annotation input by the second user with respect to the moving image is displayed in the sight of the first user or is output to be displayed. The display control unit further displays the displayed or output annotation toward the second user.

According to the present disclosure, there is provided a display control method including: acquiring a moving image corresponding to a sight of a first user in real time; displaying the moving image toward a second user different from the first user, detecting, by a processor, that an annotation input by the second user with respect to the moving image is displayed in the sight of the first user or is output to be displayed; and displaying the displayed or output annotation toward the second user.

According to the present disclosure, there is provided a program for causing a computer to implement: a function of acquiring a moving image corresponding to a sight of a first user in real time; a function of displaying the moving image toward a second user different from the first user; a function of detecting that an annotation input by the second user with respect to the moving image is displayed in the sight of the first user or is output to be displayed; and a function of displaying the displayed or output annotation toward the second user.

Advantageous Effects of Invention

According to an embodiment of the present disclosure described above, it is possible to further facilitate interaction between users using AR technologies.

DESCRIPTION OF EMBODIMENTS

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

Note that description will be made in the following order.
1. First Embodiment
   1-1. System Configuration
   1-2. Device Configuration
   1-3. Function and Configuration
   1-4. Exemplary Display
   1-5. Exemplary Variant
2. Second Embodiment
   2-1. Function and Configuration
   2-2. Sequence Example
   2-3. Exemplary Display
3. Third Embodiment
4. Fourth Embodiment
5. Hardware Configuration
6. Supplement 1. First Embodiment (1-1. System Configuration)

Figure 1:
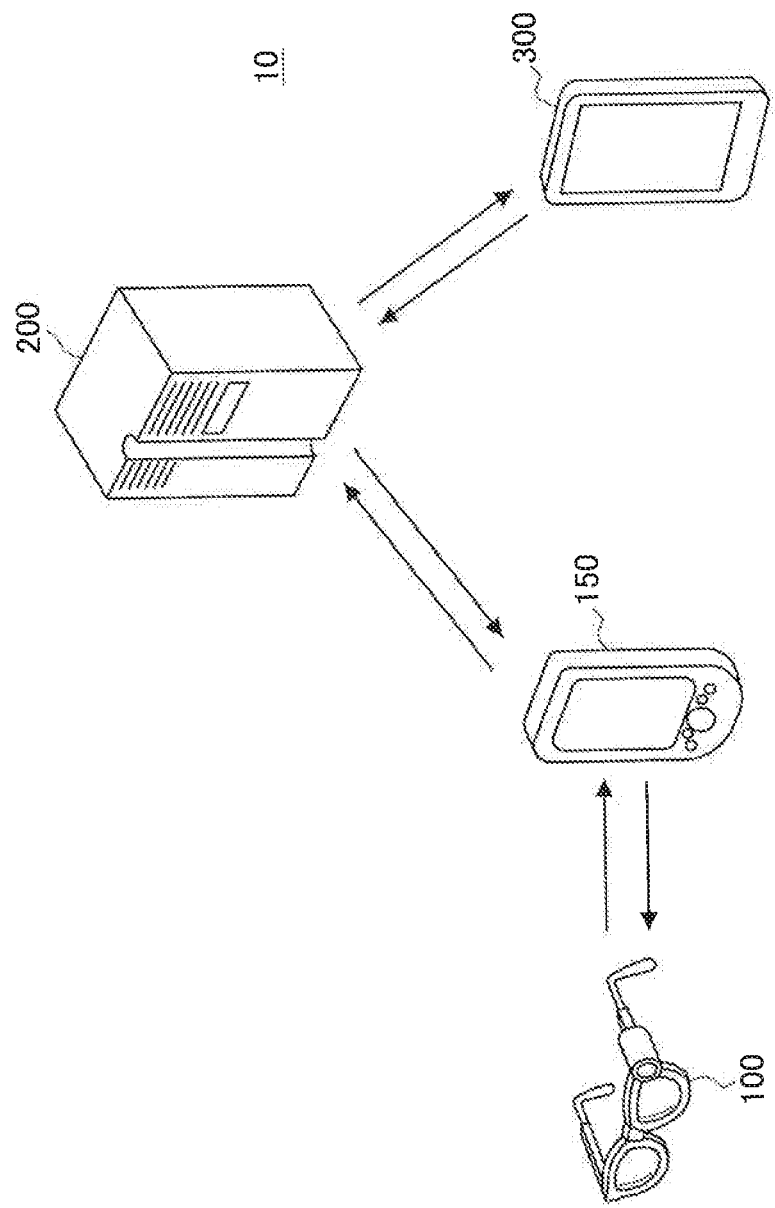
FIG. 1 is a diagram illustrating a schematic configuration of a system according to a first embodiment of the present disclosure.

FIG. 1 is a diagram illustrating a schematic configuration of a system according to the first embodiment of the present disclosure. Referring to FIG. 1, the system 10 includes a wearable display 100, a smartphone 150, a server 200, and a tablet terminal 300. The wearable display 100 and the smartphone 150 are connected by Bluetooth (registered trademark), for example. Also, the server 200 is connected to the smartphone 150 and the tablet terminal 300 via various types of wired or wireless networks.

In the system 10, a moving image captured by a camera (a head mounted camera) equipped in the wearable display 100 of glasses type worn by a first user is streamed and delivered in real time to the tablet terminal 300 via the smartphone 150 and the server 200. The delivered moving image can be processed in such a manner that its scope and orientation correspond to the sight of the first user. In this way, a second user that browses the moving image on the tablet terminal 300 has an experience as if sharing visual perception with the first user.

Further, the second user that browses the moving image on the tablet terminal 300 can input an annotation into the moving image that is streamed and delivered. Here, the annotation is information added to and presented in an image of a real space that the first user is viewing, and can take various types of forms, such as text, icon, or animation. The second user can add a comment to what appears in the sight of the first user, and can provide the first user with information, for example by the input of the annotation. That is, the second user can interfere the experience of the first user by the annotation.

The annotation input by the second user at the tablet terminal 300 is transmitted to the smartphone 150 via the server 200, and is displayed in the sight of the first user at the wearable display 100 by the control of the smartphone 150. As described later, the annotation may be displayed transparently or translucently in the first sight, and may be integrated into a picture image displayed toward the first user. In this way, in the system 10, an interaction between users, which is mediated by the moving image that is streamed and delivered, is established.

(1-2. Device Configuration)

Figure 2:
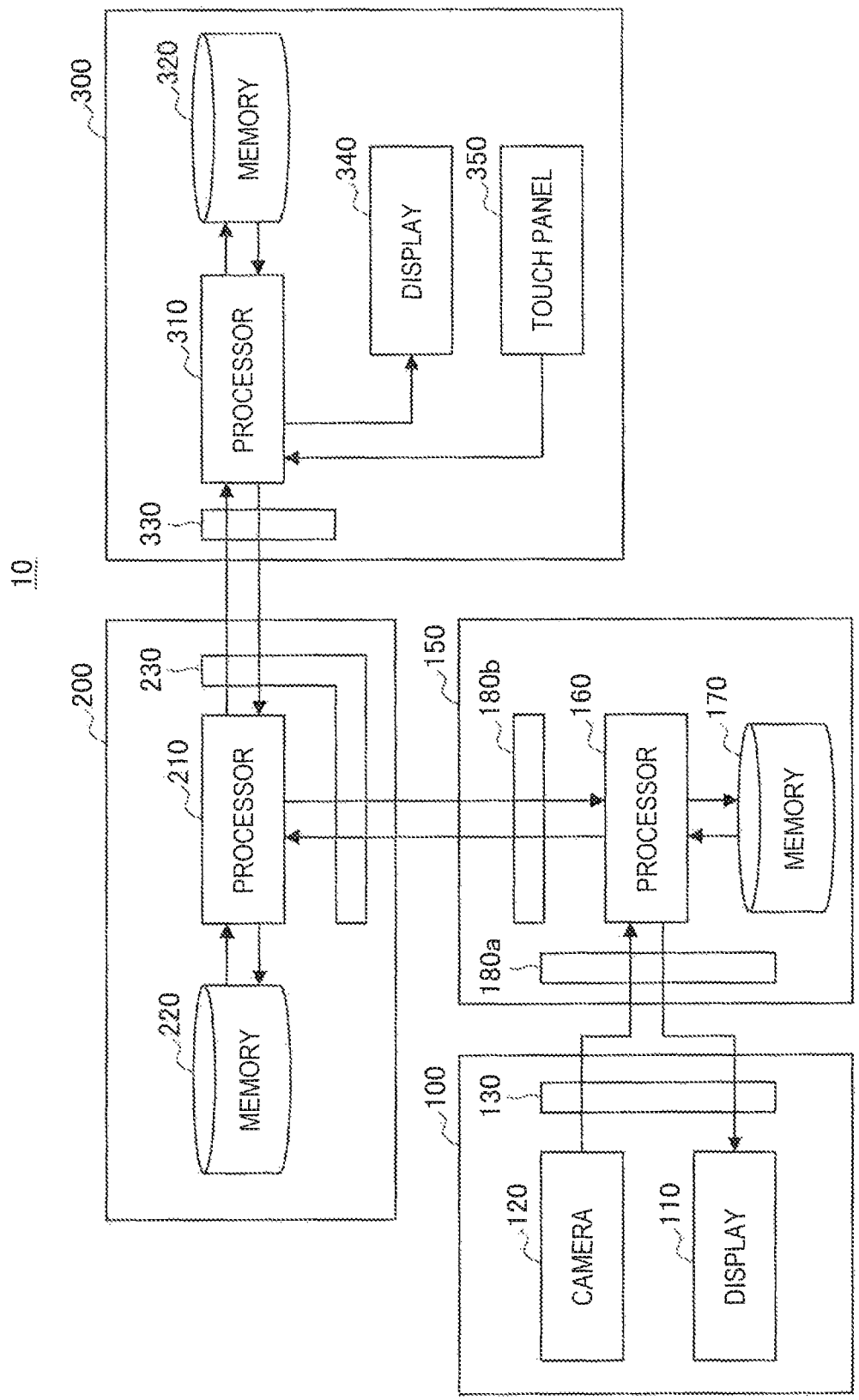
FIG. 2 is a diagram illustrating a schematic configuration of a device according to the first embodiment of the present disclosure.

FIG. 2 is a diagram illustrating a schematic configuration of devices according to the first embodiment of the present disclosure. Note that the depicted components of each device is limited to the part related to the function of the embodiment described below, and each device can further include components that are not depicted. The description of the hardware configuration of the information processing apparatus described later is to be referred to, with respect to a more detailed configuration of each device. In the following, with reference to FIG. 2, the configuration of each device included in the system 10 will be described.

(Wearable Display)

The wearable display 100 includes a display 110, a camera 120, and a communication unit 130.

The display 110 is an LCD or an organic EL display for example, and presents various types of information to the first user that wears the wearable display 100. More specifically, the display 110 may be a transparent display, and may be a closed display. When the display 110 is transparent, the first user visually confirms the surrounding real space through the display 110 directly. The display 110 electronically displays additional information such as an annotation, to superimpose it on an image of the real space. On the other hand, when the display 110 is a closed type, the first user visually confirms the surrounding real space indirectly by a picture image of the real space created by processing the moving image captured by the camera 120 in such a manner to correspond to the sight of the first user. The display 110 displays a picture image created by integrating the additional information such as the annotation into the picture image of the real space. Note that, in the following description, the display 110 can be either one of the transparent type and the closed type, unless otherwise described.

The camera 120 is the above head mounted camera. The moving image captured by the camera 120 is processed by a processor of one of the devices described later in such a manner to correspond to the sight of the first user for example, and then is displayed toward the second user in the tablet terminal 300. Also, for example, when the display 110 is the closed type, the picture image created by processing the moving image captured by the camera 120 is displayed toward the first user as well.

The communication unit 130 is a communication circuit that executes communication by Bluetooth (registered trademark), with a communication unit 180a of the smartphone 150. In the present embodiment, the display 110 and the camera 120 included in the wearable display 100 are remotely controlled by the smartphone 150.

Note that, in another embodiment, the wearable display 100 may include a processor and a memory for the control of the display 110 and the camera 120 and other information processing. Also, in yet another embodiment, the display and the camera included in the smartphone 150 may be used instead of the wearable display 100. That is, the functions of the wearable display 100 and the smartphone 150 in the present embodiment may be implemented by a single device including a display, a camera, a processor, and a memory, and may be implemented, distributed to a plurality of devices as in the depicted example, for example.

(Smartphone)

The smartphone 150 includes a processor 160, a memory 170, and a communication unit 180.

The processor 160 executes various types of information processing in the smartphone 150. For example, the processor 160 executes a control for displaying the annotation received from the server 200 via the communication unit 180b on the display 110 of the wearable display 100. In this case, the processor 160 may notify the server 200 that the annotation is displayed on the display 110. Also, the processor 160 may process the moving image captured by the camera 120 of the wearable display 100, to deliver it to the tablet terminal 300 via the server 200. The notification of the display of the annotation may be transmitted to the server 200 via the communication unit 180b, together with the processed moving image. Various types of data used in processing in the processor 160 is stored in the memory 170.

Note that, in the present embodiment, respective functions implemented by the processor 160 of the smartphone 150, a processor 210 of the server 200, and a processor 310 of the tablet terminal 300 are interchangeable. Thus, for example, the function described as implemented by the processor 160 may be implemented by the processor 210 or the processor 310 in another embodiment. In the same way, the function described as implemented by the processor 210 may be implemented by the processor 160 or the processor 310 in another embodiment. Also, the function described as implemented by the processor 310, data stored in the memory 170 of the smartphone 150, a memory 220 of the server 200, and a memory 320 of the tablet terminal 300 in respective embodiments differs depending on the function implemented by the processor of each device.

The communication unit 180 includes a communication unit 180a which is a communication circuit that executes communication by Bluetooth (registered trademark) with the communication unit 130 of the wearable display 100, and a communication unit 180b which is a communication circuit that executes network communication with a communication unit 230 of the server 200. The network communication between the communication unit 180b and the communication unit 230 can be executed via various types of wired or wireless network, such as Wi-Fi, mobile telephone network, and the Internet. This is the same in the network communication between the communication unit 230 and a communication unit 330 of the tablet terminal 300.

(Server)

The server 200 includes the processor 210, the memory 220, and the communication unit 230.

The processor 210 executes various types of information processing in the server 200. For example, the processor 210 forwards the annotation received via the communication unit 230 from the tablet terminal 300, to the smartphone 150. For example, when the moving image is delivered from the same wearable display 100 to a plurality of tablet terminals 300, the server 200 may collect annotations input by respective tablet terminals 300 and forward them to the smartphone 150. Also, the processor 210 delivers the moving image received via the communication unit 230 from the smartphone 150, to one or a plurality of tablet terminals 300. In this case, the processor 210 may deliver information relevant to the annotation displayed in the wearable display 100, to the tablet terminal 300, on the basis of the notification from the smartphone 150. Alternatively, the processor 210 may deliver the information of the annotation output to the smartphone 150, to the tablet terminal 300. Various types of data used in processing in the processor 210 is stored in the memory 220.

The communication unit 230 is a communication circuit that executes network communication with the communication unit 180b of the smartphone 150, and the communication unit 330 of the tablet terminal 300.

(Tablet Terminal)

The tablet terminal 300 includes the processor 310, the memory 320, the communication unit 330, a display 340, and a touch panel 350.

The processor 310 executes various types of information processing in the tablet terminal 300. For example, the processor 310 executes a control for displaying the moving image received via the communication unit 330 from the server 200, on the display 340. In this case, the processor 310 may display information indicating the annotation displayed in the sight of the first user in the wearable display 100 or the annotation output from the server 200 or the smartphone 150 for display, on the display 340 together with the moving image. Also, for example, the processor 310 transmits the annotation input by the second user via the touch panel 350, to the server 200 via the communication unit 330. Various types of data used in processing in the processor 310 is stored in the memory 320.

The communication unit 330 is a communication circuit that executes network communication with the communication unit 230 of the server 200.

The display 340 is an LCD and an organic EL display for example, and presents various types of information in accordance with the control of the processor 310. For example, the display 340 displays the moving image corresponding to the sight of the first user, which is generated on the basis of the picture image captured by the camera 120 of the wearable display 100. Also, the display 340 displays information indicating the annotation which is displayed in the sight of the first user or output for display. Further, the display 340 may display a graphical user interface (GUI) for the second user to input the annotation into the moving image.

The touch panel 350 is located on a front surface of the display 340, and detects a touch of the user as an input. The touch panel 350 detects an input of text using software keyboard, a selection input of picture image or the like, and an input of character and pictorial figure by handwriting, for example. The character and the picture image input via the touch panel 350 is processed as the annotation by the processor 310, and is transmitted to the server 200 via the communication unit 330.

Although in the present embodiment the moving image corresponding to the sight of the first user that wears the wearable display 100 is delivered to the tablet terminal 300, in another embodiment the moving image can be delivered to various types of devices including a display and an input device, such as a desktop or notebook personal computer, a television, a smartphone, a media player, or a game machine, in addition to the tablet terminal 300 or instead of the tablet terminal 300. The moving image may be delivered on a wearable display different from the wearable display 100. In these cases, the input device is not limited to the touch panel illustrated in the present embodiment, but may be a keyboard, a mouse, or a hardware button, for example. Also, audio input and gesture input may be utilized to input the annotation.

(1-3. Function and Configuration)

Figure 3:
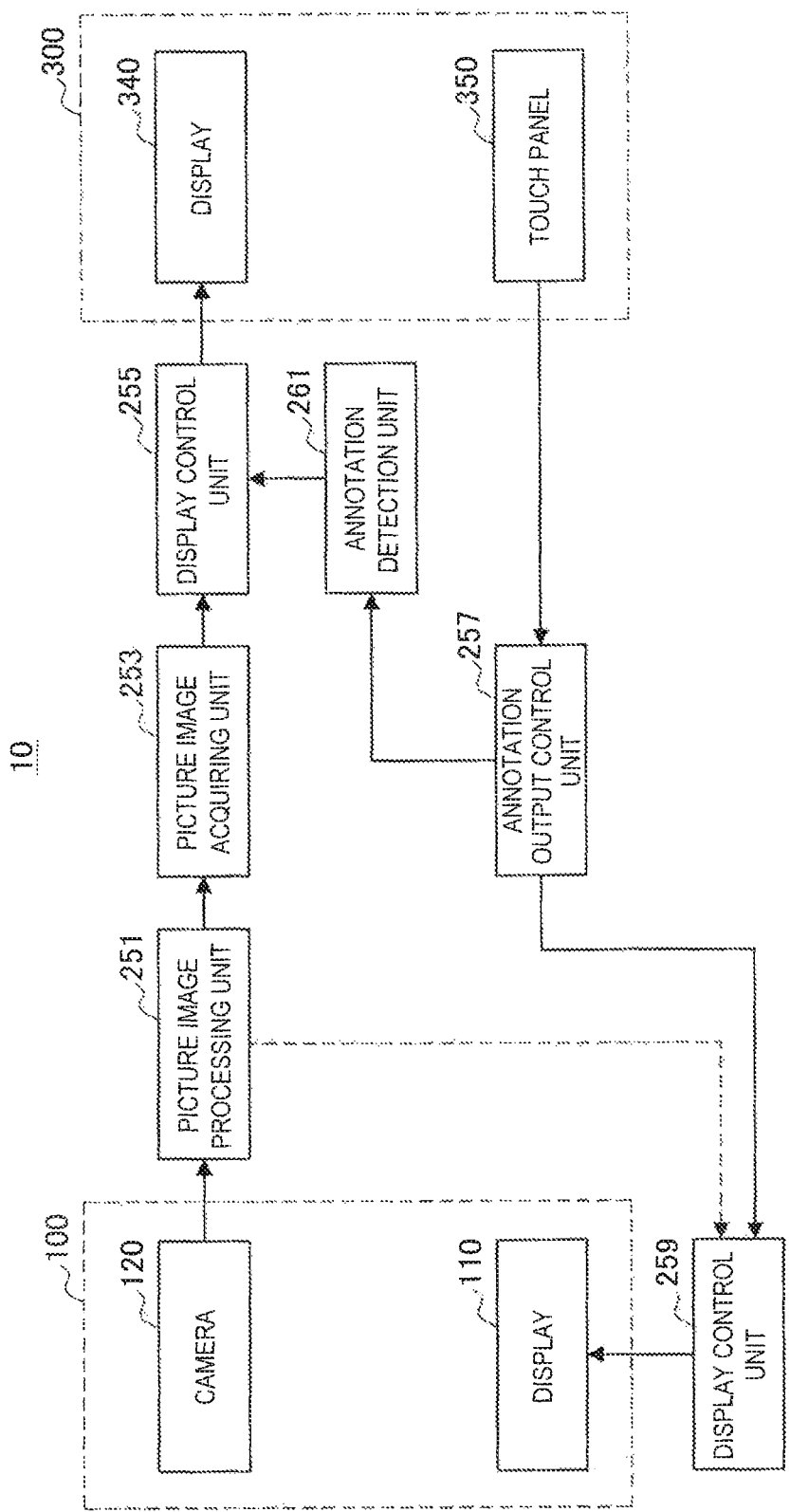
FIG. 3 is a diagram illustrating schematic functions and configuration of a system according to the first embodiment of the present disclosure.

FIG. 3 is a diagram illustrating the schematic functions and configuration of the system according to the first embodiment of the present disclosure. Referring to FIG. 3, the system 10 includes a picture image processing unit 251, a picture image acquiring unit 253, a display control unit 255, an annotation output control unit 257, a display control unit 259, and an annotation detection unit 261, as functions and configuration. These functions and configuration may be implemented by one of the processor 160 of the smartphone 150, the processor 210 of the server 200, and the processor 310 of the tablet terminal 300 for example, and may be implemented, distributed to these processors. In the following, each function and configuration will be further described.

The picture image processing unit 251 processes the moving image captured by the camera 120 equipped in the wearable display 100, in order to generate the moving image corresponding to the sight of the first user that wears the wearable display 100. For example, the picture image processing unit 251 cuts out a region corresponding to the sight, from the moving image obtained by capturing an image of a wider scope than the sight of the first user, in response to a result of calibration executed in advance. Also, for example, the picture image processing unit 251 may correct the orientation of the moving image on the basis of the positional difference between the camera 120 and the viewpoint of the first user.

The picture image acquiring unit 253 acquires the moving image processed by the picture image processing unit 251, that is, the moving image corresponding to the sight of the first user, in real time. The display control unit 255 displays the acquired moving image on the display 340 of the tablet terminal 300. As described above, the display 340 is browsed by the second user. This second user is different from the first user that wears the wearable display 100. Further, the display control unit 255 displays the annotation on the display 340, on the basis of the information provided from the annotation detection unit 261 described later. Here, the displayed annotation is an annotation that is output to be displayed in the sight of the first user.

The annotation output control unit 257 outputs the annotation that the second user inputs via the touch panel 350 of the tablet terminal 300, to display it in the sight of the first user. The display control unit 259 displays the output annotation on the display 110 of the wearable display 100. The wearable display 100 is worn by the first user, and therefore the annotation displayed on the display 110 is displayed in the sight of the first user. Note that, when the display 110 is the closed type, the display control unit 259 further displays the picture image acquired from the picture image processing unit 251 on the display 110.

The annotation detection unit 261 detects that the annotation input by the second user into the moving image displayed on the display 340 at the tablet terminal 300 is output from the annotation output control unit 257. More specifically, the annotation detection unit 261 acquires information indicating the output annotation, from the annotation output control unit 257. The annotation detection unit 261 supplies the information indicating the output annotation to the display control unit 255.

By the above functions and configuration, the information indicating the output annotation can be displayed toward the second user, at a closer time point to the time point the annotation is actually displayed in the sight to the first user, for example. A difference can be generated between the transmission time point and the display time point of the annotation, due to a communication delay between the tablet terminal 300 and the server 200 or between the tablet terminal 300 and the smartphone 150 for example, and thus this function and configuration can be effective. Note that, when the above effect is considered, it is desirable that the annotation output control unit 257 is configured with a processor of a device other than the tablet terminal 300 (because the communication delay does not have an influence when the annotation output control unit 257 is configured at the tablet terminal 300).

(1-4. Exemplary Display)

(Exemplary Display in Wearable Display)

Figure 4:
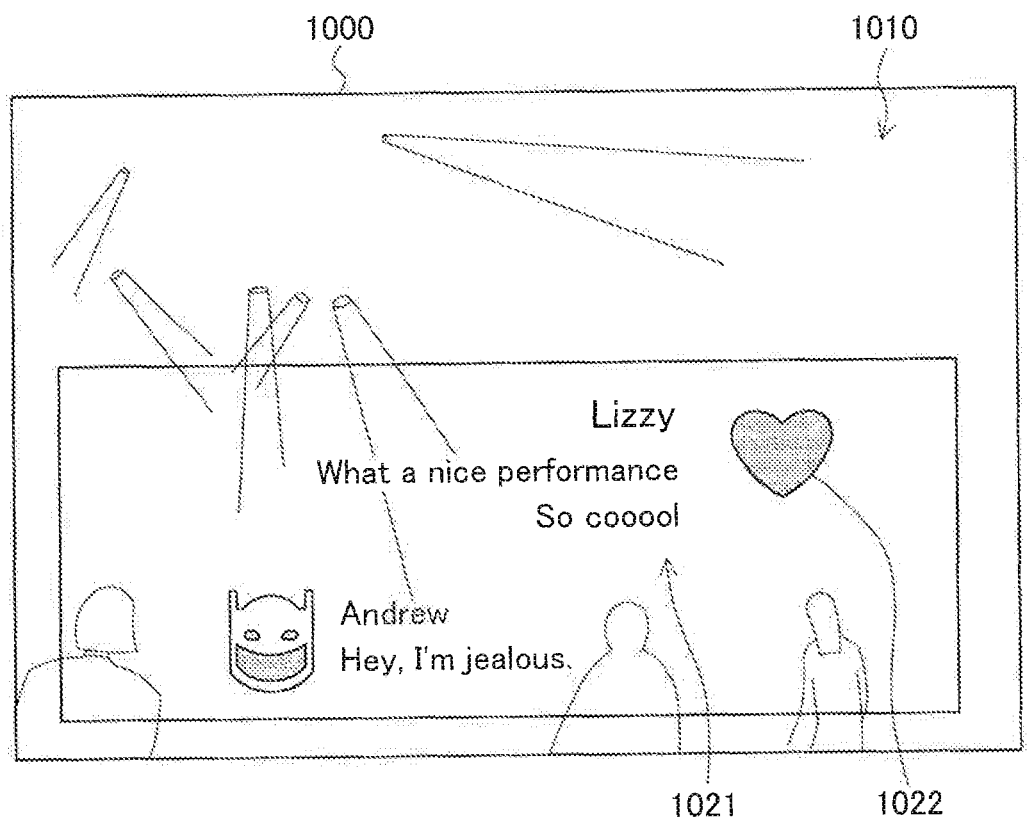
FIG. 4 is a diagram illustrating an exemplary display in a wearable display in the first embodiment of the present disclosure.

FIG. 4 is a diagram illustrating an exemplary display at the wearable display in the first embodiment of the present disclosure. Referring to FIG. 4, an image 1010 of the real space, a text 1021, and a stamp 1022 are displayed in a screen image 1000 displayed on the display 110 of the wearable display 100.

The image 1010 of the real space may be visually confirmed through the transparent display 110 directly as described above, and may be a picture image that is electronically displayed on the closed display 110. In either case, the image 1010 of the real space is a picture image corresponding to the sight of the first user that wears the wearable display 100.

The text 1021 and the stamp 1022 are each annotations input by the first user in the tablet terminal 300, into the image 1010 of the real space delivered as the moving image. The text 1021 and the stamp 1022 are transparently or translucently superimposed on the image 1010 of the real space, or are integrated into the picture image that forms the image 1010 of the real space.

Note that, in the depicted example, the moving image is delivered to a plurality of tablet terminals 300, and the annotation is input at a plurality of tablet terminals 300. Thus, the text 1021 includes a name of the user that inputs the annotation.

(Exemplary Display in Tablet Terminal)

Figure 5:
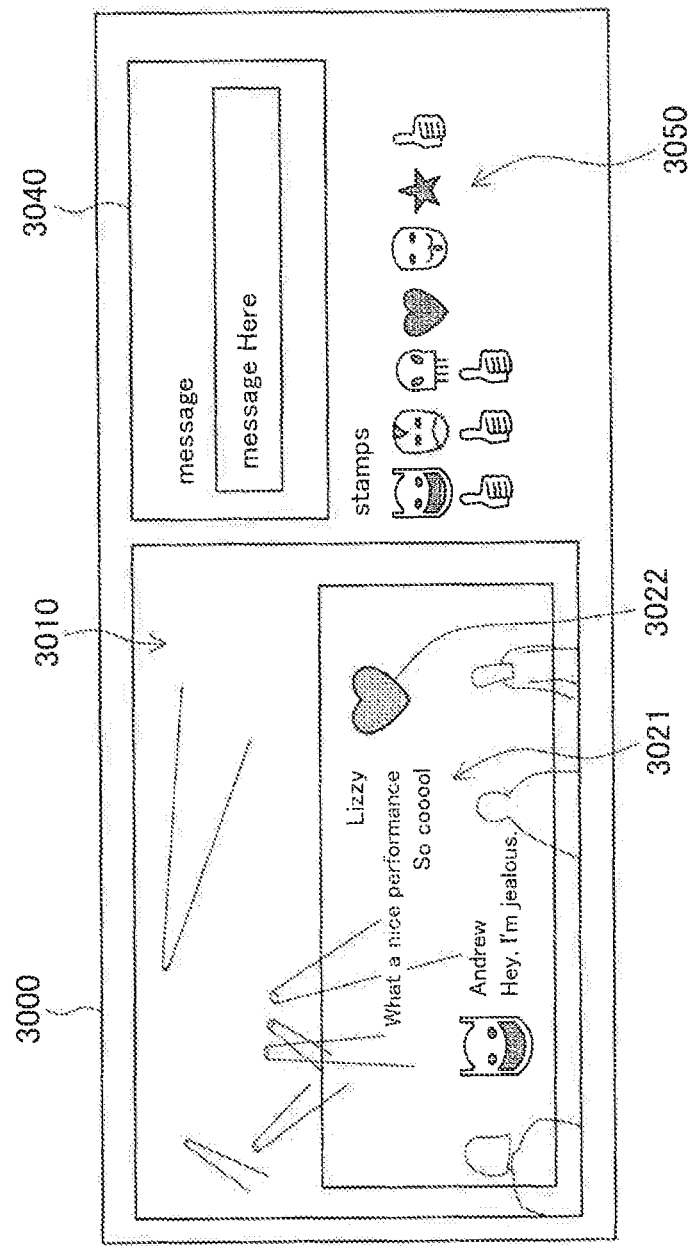
FIG. 5 is a diagram illustrating an exemplary display in a tablet terminal in the first embodiment of the present disclosure.

FIG. 5 is a diagram illustrating an exemplary display at the tablet terminal in the first embodiment of the present disclosure. Referring to FIG. 5, a moving image 3010, a text 3021, a stamp 3022, a text input box 3040, and a stamp selection box 3050 are displayed in a screen image 3000 displayed on the display 340 of the tablet terminal 300.

The moving image 3010 is a picture image corresponding to the sight of the first user, which is generated by processing the moving image captured by the camera 120 equipped in the wearable display 100. The moving image 3010 is displayed in real time, except for the temporal difference due to the communication delay and the like. That is, the moving image 3010 almost synchronizes with the image 1010 of the real space displayed by the wearable display 100.

The text 3021 and the stamp 3022 are an annotation that is output to be displayed in the sight of the first user at the wearable display 100. In the depicted example, these annotation are integrated into the moving image 3010. The display control unit 255 may execute a process for integrating the annotation into the moving image 3010. Note that, in another example, the annotation may be displayed separately from the moving image 3010.

The text input box 3040 is displayed to input a text of the annotation. The second user that uses the tablet terminal 300 locates a cursor on the text input box 3040 by using the touch panel 350, and inputs a text by using a software keyboard, for example. The stamp selection box 3050 is displayed to input a stamp of the annotation. The second user uses the touch panel 350 for example, to select a stamp indicating evaluation, remark or the like of the moving image 3010.

Here, the text 3021 and the stamp 3022 displayed in the screen image 3000 are displayed on the basis of the information acquired via the annotation detection unit 261, at the time point when the annotations are output from the annotation output control unit 257 implemented in the server 200 or the smartphone 150 after the text and the stamp input by using the text input box 3040 and the stamp selection box 3050 are once transmitted to the server 200 from the tablet terminal 300, for example. Thus, there is a little temporal difference by the time at which the text and the stamp input by using the text input box 3040 and the stamp selection box 3050 are displayed as the text 3021 and the stamp 3022, and the temporal difference reflects a part of the difference between the transmission time point and the display time point of the annotation.

(1-5. Exemplary Variant)

Figure 6:
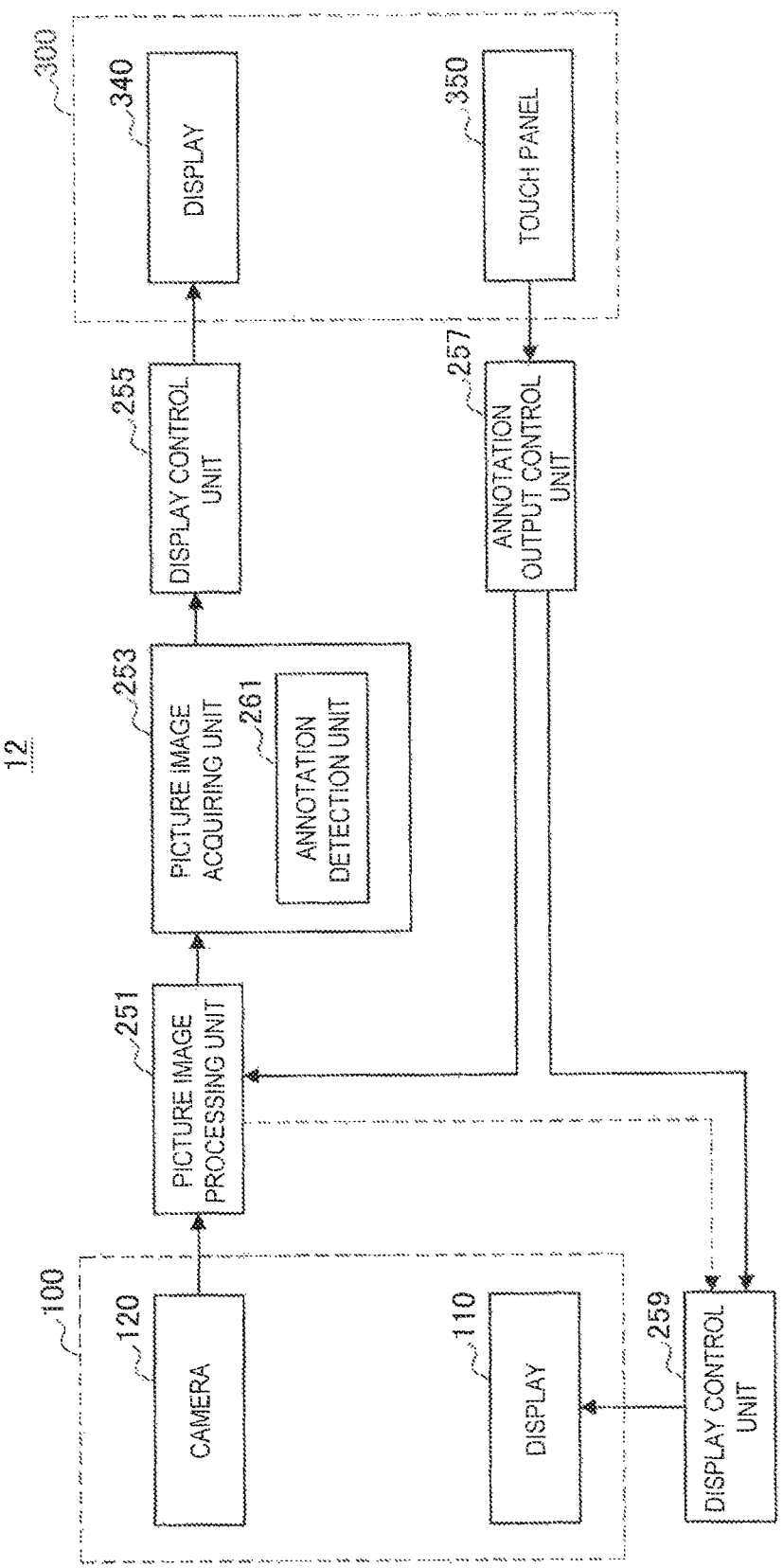
FIG. 6 is a diagram illustrating schematic functions and configuration of a system according to an exemplary variant of the first embodiment of the present disclosure.

FIG. 6 is a diagram illustrating schematic functions and configuration of the system according to an exemplary variant of the first embodiment of the present disclosure. Referring to FIG. 6, in the system 12, the annotation output control unit 257 outputs the information of the annotation to the picture image processing unit 251 in addition to the display control unit 259. The picture image processing unit 251 executes a process for integrating the annotation into the generated moving image, in addition to processes for cutting out a region from the moving image captured by the camera 120 and correcting the orientation. That is, in the present exemplary variant, the annotation is already integrated into the moving image processed by the picture image processing unit 251, in other words, the moving image corresponding to the sight of the first user. Thus, the picture image acquiring unit 253, which acquires the processed moving image, also acquires the information of the annotation output together with the moving image, in order to implement the function of the annotation detection unit 261 as well.

In the present exemplary variant, the moving image and the annotation are transmitted in an integrated state in a part at or after the picture image processing unit 251, and thus a temporal difference is not generated between the moving image and the annotation in this part due to the communication delay, the processing delay, and the like. Thus, display of the moving image corresponding to the sight of the first user and the annotation output to be displayed in the sight of the first user is synchronized more accurately.

Also, when the display 110 of the wearable display 100 is the closed type, the display control unit 259 displays the picture image acquired from the picture image processing unit 251 on the display 110, so that the same relationship is established between the moving image and the annotation displayed by the wearable display 100 and the tablet terminal 300. In this case, the annotation displayed on the display 340 of the tablet terminal 300 is the annotation that is actually displayed in the sight of the first user.

2. Second Embodiment

Next, the second embodiment of the present disclosure will be described. Note that duplicate description will be omitted with respect to the same configuration (system configuration and device configuration) as the above first embodiment.

(2-1. Function and Configuration)

Figure 7:
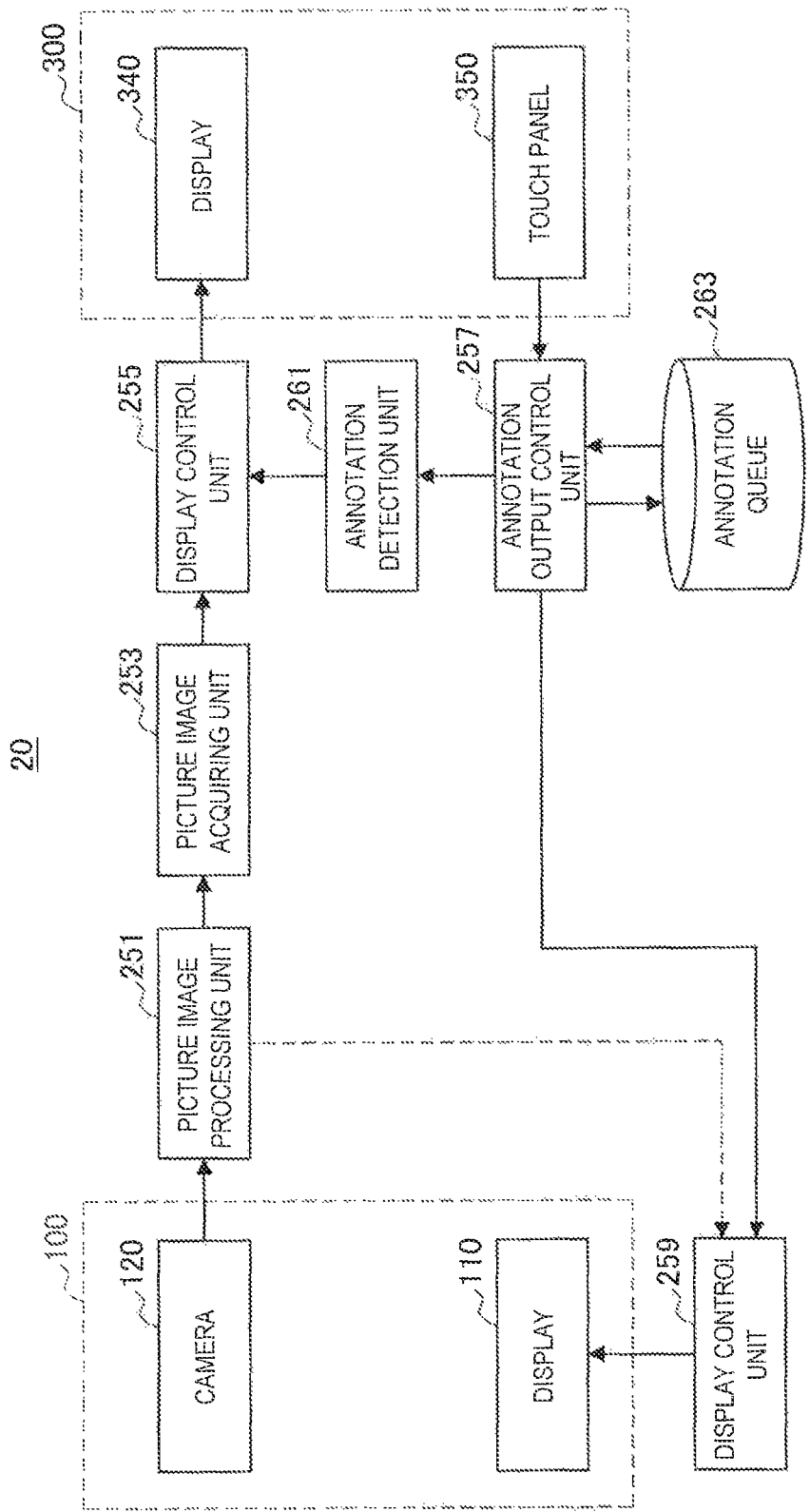
FIG. 7 is a diagram illustrating schematic functions and configuration of a system according to a second embodiment of the present disclosure.

FIG. 7 is a diagram illustrating schematic functions and configuration of the system according to the second embodiment of the present disclosure. Referring to FIG. 7, the system 20 includes a picture image processing unit 251, a picture image acquiring unit 253, a display control unit 255, an annotation output control unit 257, a display control unit 259, an annotation detection unit 261, and an annotation queue 263, as functions and configuration. The annotation queue 263 added in the present embodiment can be configured with one of the memory 170 of the smartphone 150, the memory 220 of the server 200, or the memory 320 of the tablet terminal 300, for example. In the following, these functions and configuration will be described with respect to different points from the first embodiment mainly.

The first user that wears the wearable display 100 acts in the real space. Thus, the sight of the first user is needed to a certain extent, in order to act safely, and in order to view what he/she wants to view. Thus, in the example illustrated in FIG. 4, it is desirable that the region in which the text 1021 and the stamp 1022 are the superimposed or integrated is limited in the image 1010 of the real space displayed on the display 110. Thus, in the case of the example of FIG. 4, the number of the texts 1021 and the stamps 1022 that are simultaneously displayed on the display 110 may be limited to two, for example.

Also, the first user acts in the real space, and thus does not necessarily dedicate himself or herself to visually confirming the displayed annotation. That is, it is assumed that the first user visually confirms the annotation on the side in many cases. Thus, it is desirable that the time for continuing display of the same annotation is longer than a case in which the user can dedicate himself or herself to visually confirming the annotation.

By the above reason, in the present embodiment, the number of annotations simultaneously displayed in the sight of the first user is limited to a predetermined threshold value or less, and the time for continuing the display of the same annotation is limited to a predetermined threshold value or more. Thus, the annotation output control unit 257 outputs the annotation that one or a plurality of second users input via the touch panel 350 of the tablet terminal 300, at a predetermined rate that is decided according to the above display number and/or the display continuing time. When the input rate of the annotation has exceeded a predetermined rate of the output, the annotation output control unit queues the input annotation in the annotation queue 263.

On the other hand, when the annotation output control unit 257 queues the annotation as described above, it is possible that the communication is not smooth, without knowing the timing at which the input comment is displayed in the sight of the first user, from the view point of the communication between the second user that inputs the annotation and the first user that browses the annotation.

In the present embodiment, in the same way as the above first embodiment, the annotation detection unit 261 detects that the annotation is output from the annotation output control unit 257, and information indicating the output annotation is supplied to the display control unit 255. The display control unit 255 displays the output annotation on the display 340 of the tablet terminal 300, on the basis of this information. Thus, the second user can know the timing at which the input comment is output to be displayed in the sight of the first user, and can input the next comment after the comment input in advance is output, for example.

Further, the annotation detection unit 261 may detect that the input annotation is queued to be displayed or output. In this case, information indicating the queued annotation is supplied to the display control unit 255, in addition to the information indicating the output annotation. The display control unit 255 displays the queued annotation on the display 340, on the basis of this information. Thereby, the second user can know that it is a state in which the input annotation is queued. Also, the second user can predict a timing at which the input annotation is displayed in the sight of the first user.

In the above case, the annotation output control unit 257 may delete at least a part of the queued annotation, on the basis of operation of the second user via the touch panel 350. Thereby, for example, when losing a chance while the annotation is queued, the second user can delete the annotation that is meaningless now, from the queue by the operation of himself or herself. For example, when there is a plurality of second users, each user can perform the above operation, and thus the sight of the first user is prevented from being blocked by meaningless annotations that have lost chances.

(2-2. Sequence Example)

Figure 8:
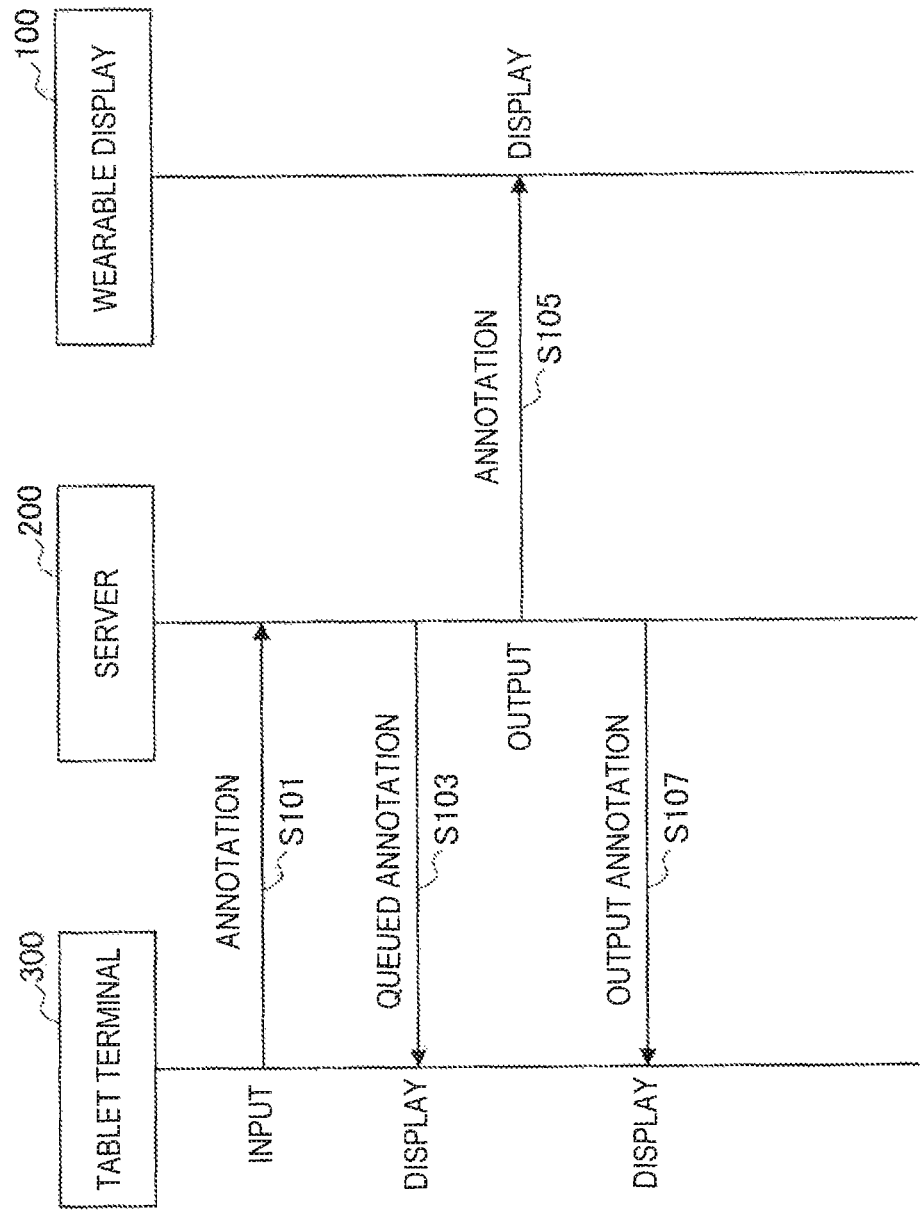
FIG. 8 is a diagram illustrating an example of a sequence in the second embodiment of the present disclosure.

FIG. 8 is a diagram illustrating an example of the sequence in the second embodiment of the present disclosure. Note that FIG. 8 illustrates a case in which the display control unit 255, the annotation output control unit 257, and the annotation detection unit 261 are implemented in the server 200. Referring to FIG. 8, first, the input annotation is transmitted from the tablet terminal 300 to the server 200 (S101). In the depicted example, here, the annotation output control unit 257 queues the annotation. The annotation detection unit 261 detects that the annotation is queued, and supplies the information indicating the annotation to the display control unit 255. The queued annotation is displayed on the display 340 in the tablet terminal 300, in accordance with the information transmitted from the display control unit 255 (S103).

Thereafter, when the annotation output control unit 257 takes out the above annotation from the annotation queue 263 and outputs it to display it at the wearable display 100 (S105), the annotation detection unit 261 detects that the annotation is output, and supplies the information indicating the annotation to the display control unit 255. The annotation output to the display 340 is displayed at the tablet terminal 300, in accordance with the information transmitted from the display control unit 255 (S107).

(2-3. Exemplary Display)

Figure 9:
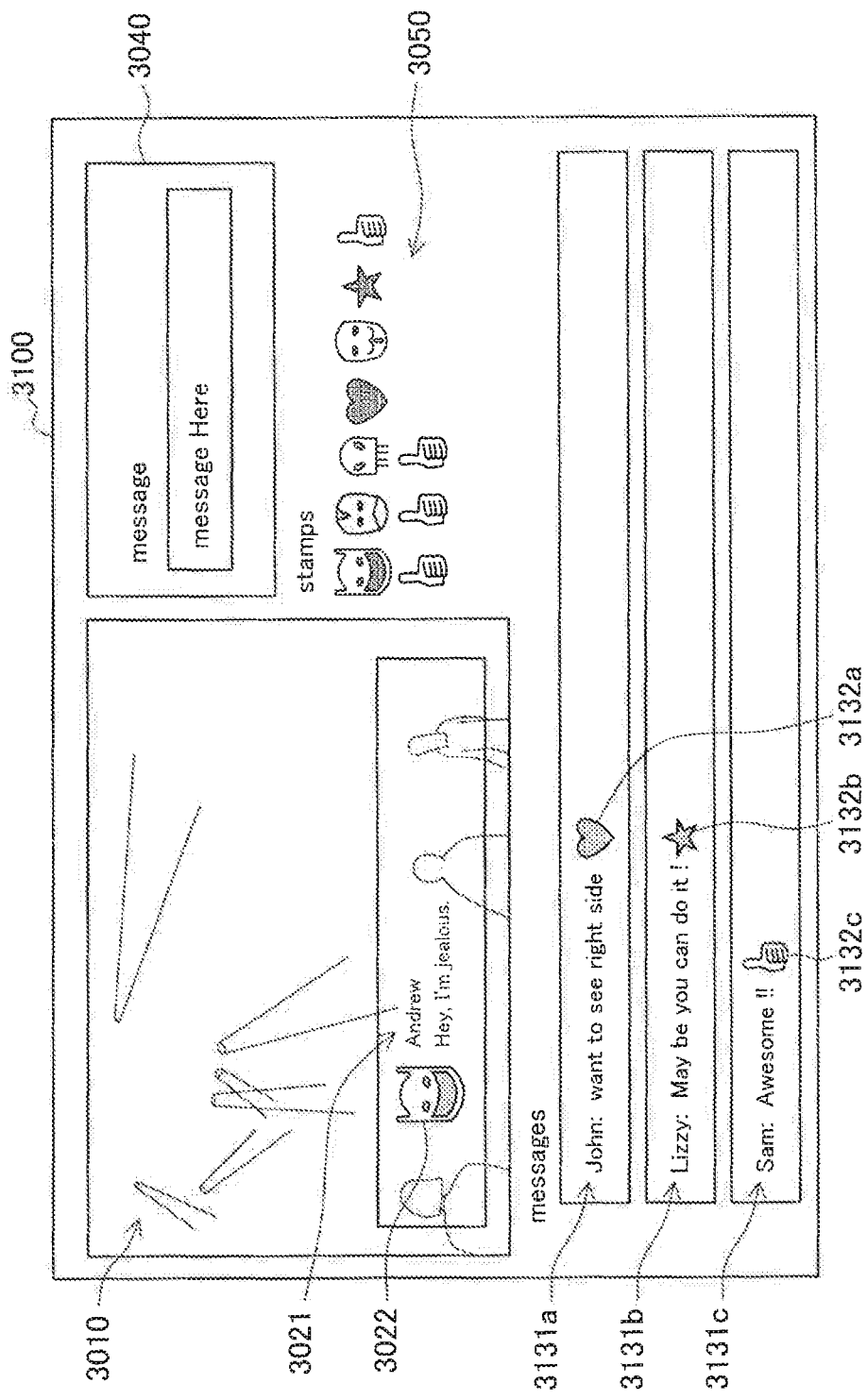
FIG. 9 is a diagram illustrating an exemplary display in a tablet terminal in the second embodiment of the present disclosure.

FIG. 9 is a diagram illustrating an exemplary display at the tablet terminal in the second embodiment of the present disclosure. Note that an exemplary display at the wearable display 100 is the same as the above first embodiment, and thus its description will be omitted. Referring to FIG. 9, queued texts 3131 and queued stamps 3132 are displayed in the screen image 3100 displayed on the display 340 of the tablet terminal 300, in addition to the same moving image 3010, text 3021, stamp 3022, text input box 3040, and stamp selection box 3050 as the screen image 3000 described with reference to FIG. 5 in the first embodiment.

The queued texts 3131 and the stamps 3132 are displayed in a different form from the text 3021 and the stamp 3022 integrated into the moving image 3010. More specifically, the texts 3131 and the stamps 3132 are arranged under the moving image 3010. This arrangement corresponds to the state of the annotation queue 263. That is, in the state of the depicted example, what the annotation output control unit 257 outputs next are the texts 3131*a* and the stamp 3132*a*, and what are output next to them are the texts 3131*b* and the stamp 3132*b*, and then what are output next to them are the texts 3131*c* and the stamp 3132*c*.

3. Third Embodiment

Next, the third embodiment of the present disclosure will be described. Note that duplicate description will be omitted with respect to the same configuration (system configuration and device configuration, etc.) as the above first and second embodiments.

Figure 10:
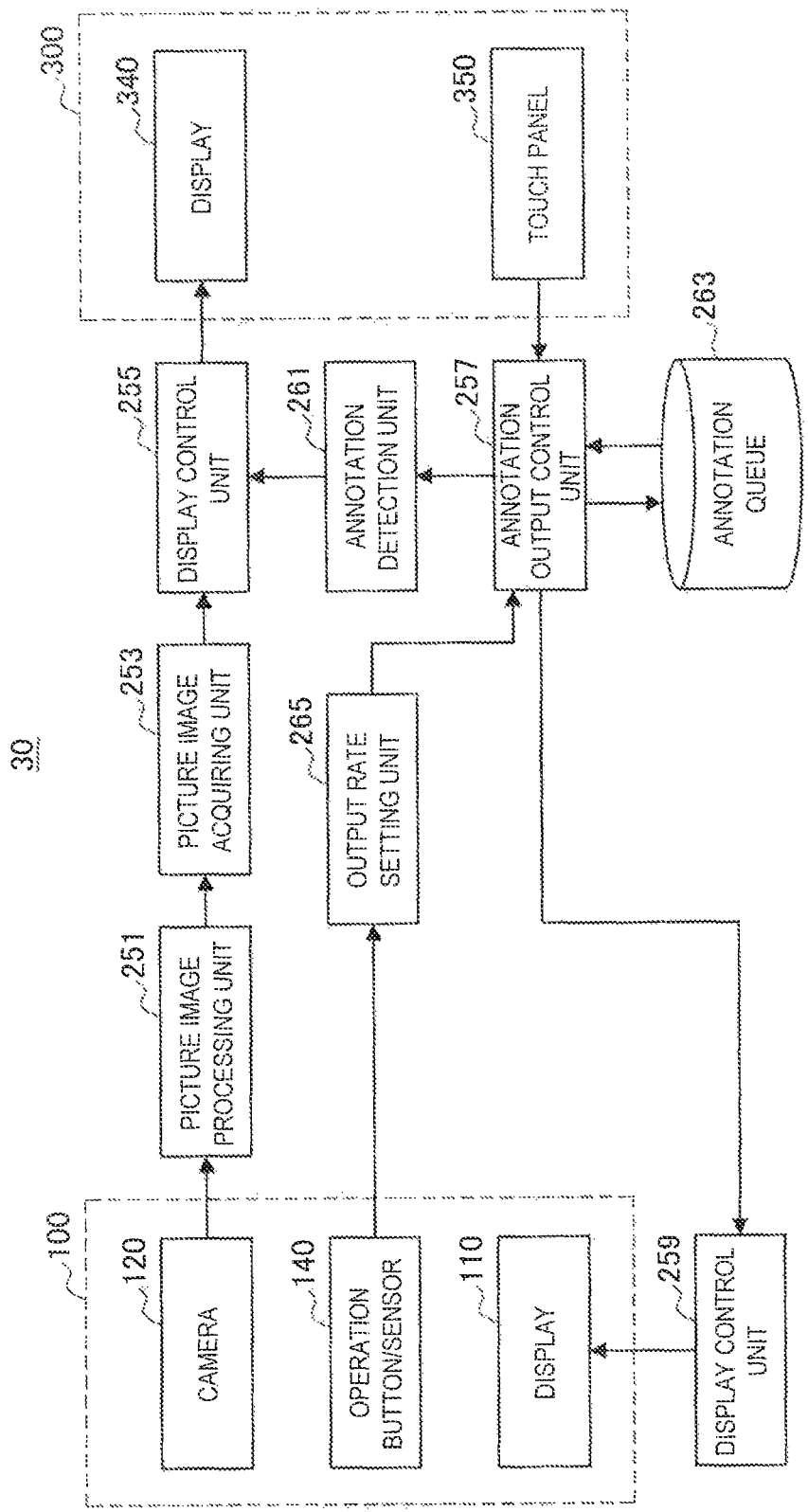
FIG. 10 is a diagram illustrating schematic functions and configuration of a system according to a third embodiment of the present disclosure.

FIG. 10 is a diagram illustrating schematic functions and configuration of the system according to the third embodiment of the present disclosure. Referring to FIG. 10, in the system 30, an output rate setting unit 265 is further implemented as a function and configuration. Also, in the system 30, an operation button/sensor 140 is provided in the wearable display 100. The output rate setting unit 265 may set a predetermined rate at which the annotation output control unit 257 outputs the annotation, on the basis of operation of the first user via the operation button, for example. Alternatively, the output rate setting unit 265 may set a predetermined rate at which the annotation output control unit 257 outputs the annotation, on the basis of sensing information of the first user acquired by the sensor.

Thereby, for example, the first user that wears the wearable display 100 can increase the output rate of the annotation by the operation via the operation button or the like, when determining that he or she can be dedicated to visually confirming the annotation. For example, by increasing the output rate, the annotation may be displayed by using a wider region of the display 110, and the time during which the display of the same annotation is continued may be shortened. Note that the operation button of the wearable display 100 may be replaced by an input device such as a touch panel included in a smartphone 150, audio input, gesture input, or the like, for example.

Alternatively, when a predetermined operation by the first user is acquired via the operation button, the annotation output control unit 257 may set the output rate of the annotation by the annotation output control unit 257 at the maximum value, until the amount of the annotation queued in the annotation queue 263 becomes less than a predetermined threshold value. When the output rate is set at the maximum value, the annotation is displayed on the entire display 110, and the display continuing time of the annotation is set at the minimum limit, for example. Thereby, when the first user can be dedicated to visually confirming the annotation, by stopping acting for example, the queued annotations are displayed at a time, in order to create a state in which input annotations are displayed immediately when starting acting again.

Also, for example, the output rate setting unit 265 may estimate the surrounding environment of the first user on the basis of the sensing information of the first user, and set the output rate on the basis of the result of the estimation. More specifically, for example, the output rate setting unit 265 may decrease the output rate, when it is estimated that the first user is exercising (for example, walking and running, etc.) on the basis of the detection result of an acceleration sensor equipped in the wearable display 100. Also, for example, the output rate setting unit 265 may decrease the output rate, when it is estimated that the first user is in a bustling site, on the basis of the detection result of a sound sensor equipped in the wearable display 100.

In order to decrease the output rate in this case, the output rate setting unit 265 may set the output rate at 0 temporarily. When the output rate is set at 0, the annotation output control unit 257 does not output the annotation, and the annotation is not displayed on the display 110 of the wearable display 100. While the annotation is not displayed, a fewer objects are superimposed on the image of the real space to be displayed on the display 110 (it is possible that objects other than the annotation continues to be displayed), and therefore the first user easily concentrates on visual confirmation of the image of the real space, in order to improve safety of act in the real space, and in order to concentrate on viewing what he/she wants to view. Note that the output rate setting unit 265 may set the output rate at 0 temporarily, in accordance with the operation of the first user via the operation button or the like.

Figure 11:
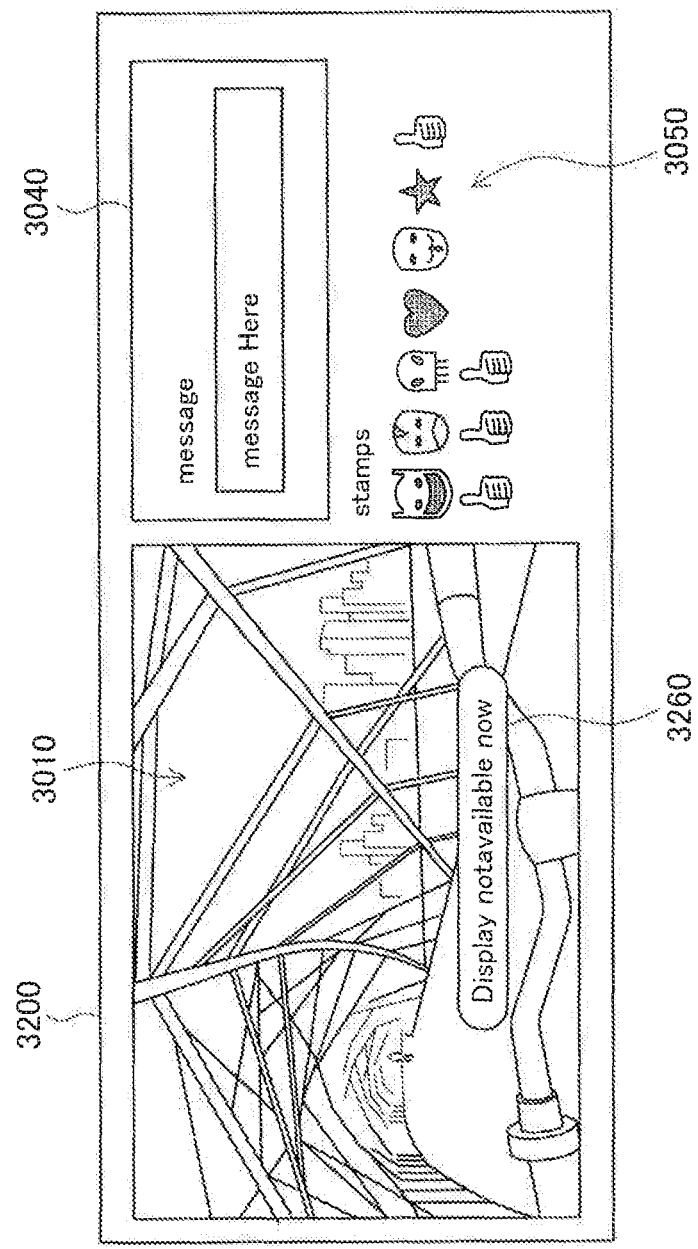
FIG. 11 is a diagram illustrating a first exemplary display in a tablet terminal when an output rate is set at 0 temporarily in the third embodiment of the present disclosure.

FIG. 11 is a diagram illustrating the first exemplary display at the tablet terminal when the output rate is set at 0 temporarily in the third embodiment of the present disclosure. Note that the wearable display 100 is in a state in which the annotation is not displayed, and thus depiction and detailed description of its exemplary display will be omitted. Referring to FIG. 11, in the screen image 3200 displayed on the display 340 of the tablet terminal 300, the same moving image 3010, text input box 3040, and stamp selection box 3050 as the screen image 3000 described with reference to FIG. 5 in the first embodiment, and an annotation undisplay notification 3260 are displayed.

The annotation undisplay notification 3260 is displayed on the basis of the information supplied from the annotation output control unit 257 via the annotation detection unit 261 to the display control unit 255, when the output rate setting unit 265 sets the output rate of the annotation at 0 temporarily, for example. Alternatively, the annotation undisplay notification 3260 may be displayed on the basis of the information supplied from the annotation output control unit 257 via the annotation detection unit 261 to the display control unit 255, when the second user inputs a new annotation at the tablet terminal 300 while the output rate of the annotation is set at 0 temporarily. Note that, in this example, the annotation output control unit 257 queues the annotation input while the output rate is 0, in the annotation queue 263.

Figure 12:
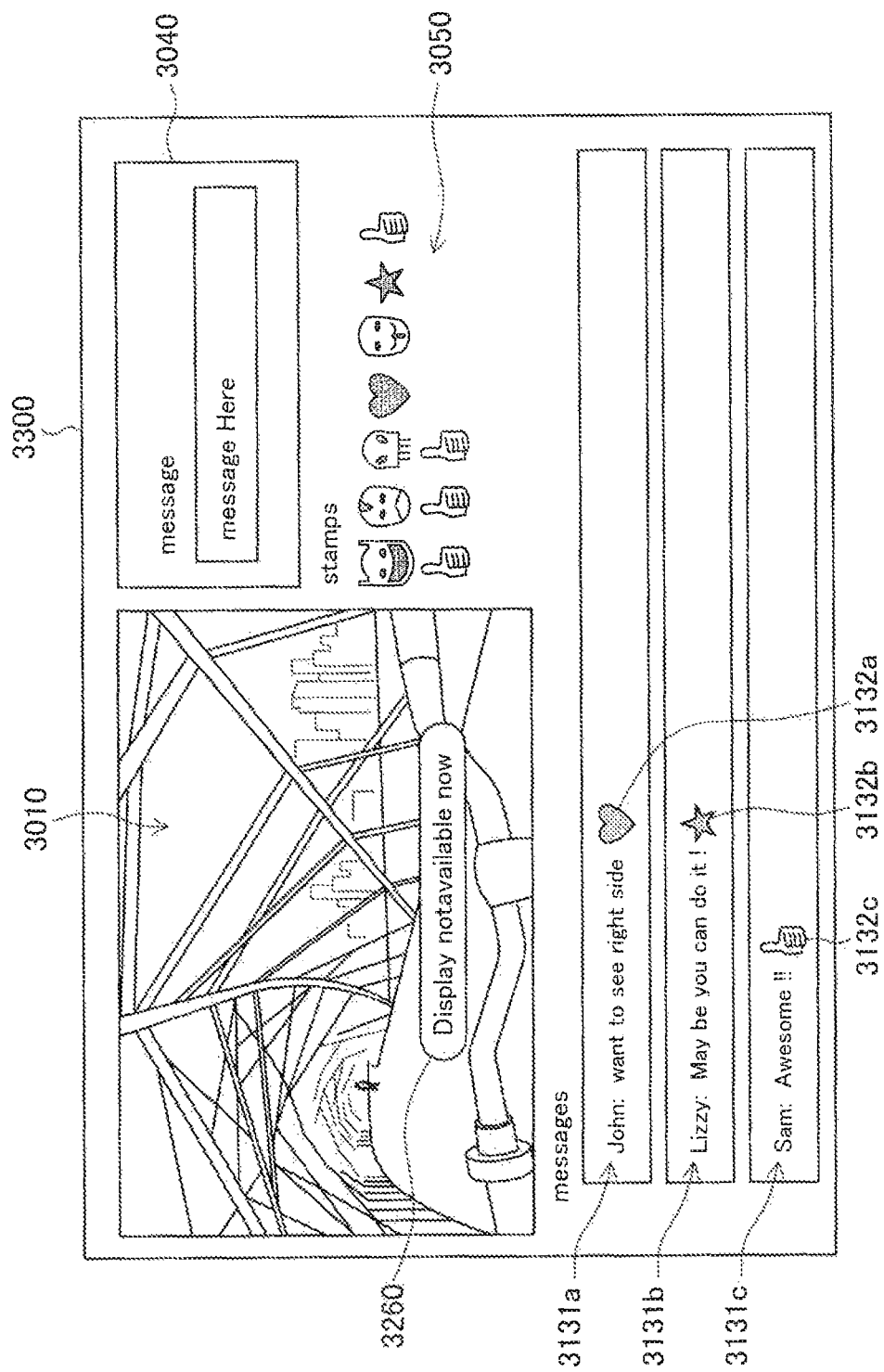
FIG. 12 is a diagram illustrating a second exemplary display in a tablet terminal when an output rate is set at 0 temporarily in the third embodiment of the present disclosure.

FIG. 12 is a diagram illustrating a second exemplary display at the tablet terminal when the output rate is set at 0 temporarily in the third embodiment of the present disclosure. Referring to FIG. 12, in the screen image 3300 displayed on the display 340 of the tablet terminal 300, the same moving image 3010, text input box 3040, stamp selection box 3050, queued texts 3131, and stamps 3132 as the screen image 3100 described with reference to FIG. 9 in the second embodiment, and the same undisplay notification 3260 as the above first example are displayed.

In this example, the second user that uses the tablet terminal 300 can know that the input annotation is not displayed in the sight of the first user temporarily, as well as the order in which the annotations are displayed when the display of the annotation is restarted. Thus, for example, as in the example described in the above second embodiment, when there is an annotation that loses a chance and becomes meaningless while the display of the annotation is suppressed, the second user that has input the annotation can delete the annotation from the queue.

4. Fourth Embodiment

Next, the fourth embodiment of the present disclosure will be described. Note that duplicate description will be omitted with respect to the same configuration (system configuration and device configuration, etc.) as the above first to third embodiments.

Figure 13:
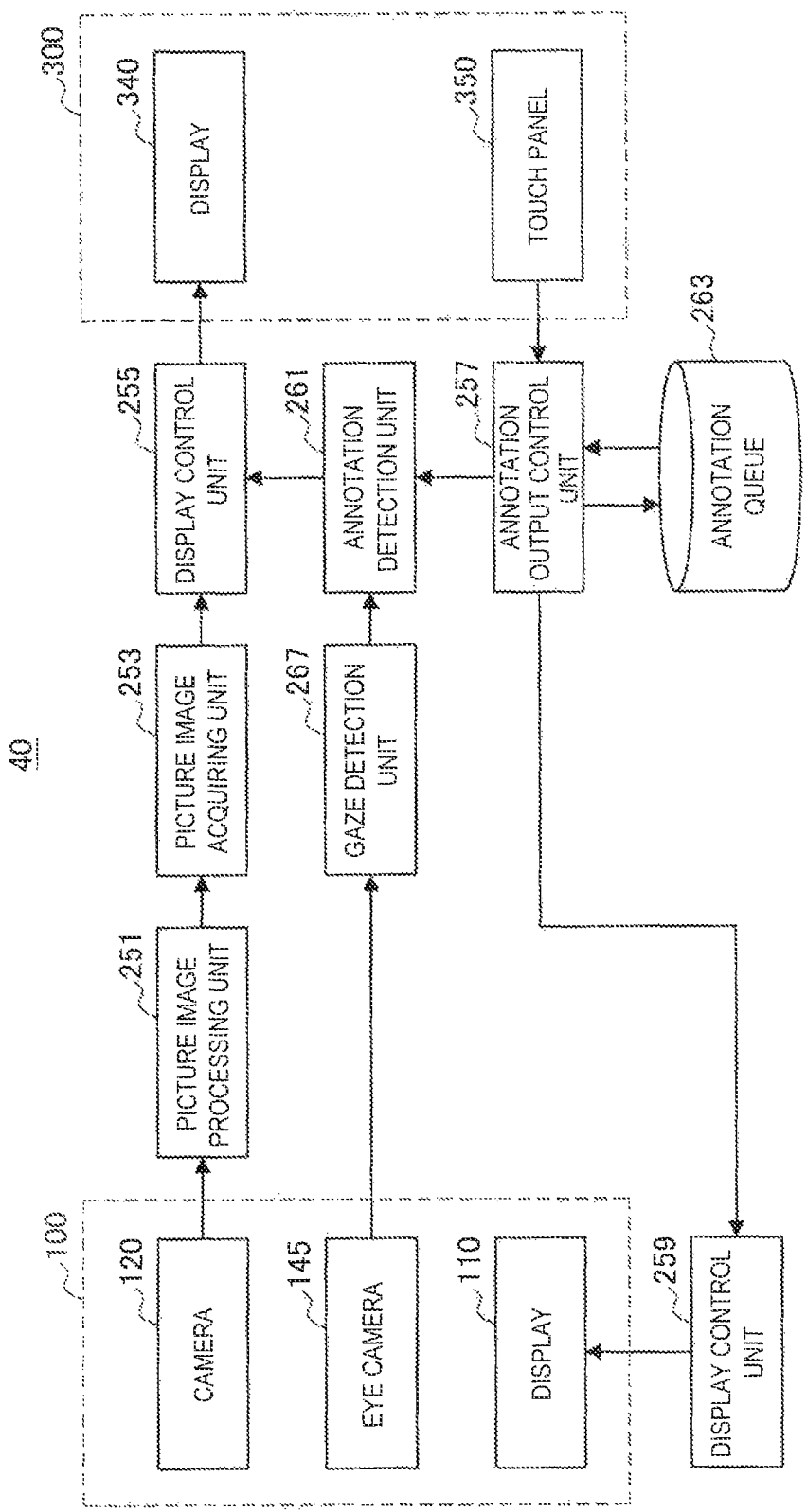
FIG. 13 is a diagram illustrating schematic functions and configuration of a system according to a fourth embodiment of the present disclosure.

FIG. 13 is a diagram illustrating schematic functions and configuration of the system according to the fourth embodiment of the present disclosure. Referring to FIG. 13, in the system 40, a gaze detection unit 267 is further implemented as function and configuration. Also, in the system 40, an eye camera 145 is provided in the wearable display 100. The gaze detection unit 267 detects a sight line of the first user that wears the wearable display 100 from the captured image by the eye camera 145, and detects that the annotation displayed on the display 1100 is gazed by the first user. More specifically, for example, the gaze detection unit 267 may detect that the annotation is gazed when the sight line of first user is identical with the displayed annotation, and may detect that the annotation is gazed when the direction of the sight line of the first user is almost identical with the direction in which the annotation is displayed.

Further, the result of the detection by the gaze detection unit 267 is supplied to the annotation detection unit 261. That is, in the present embodiment, the annotation detection unit 261 detects that the annotation is output on the basis of the information supplied from the annotation output control unit 257, and also detects that the annotation is gazed on the basis of the information supplied from the gaze detection unit 267. The display control unit 255 displays the annotations that are output to be displayed in the wearable display 100, on the display 340 of the tablet terminal 300, and displays a notification indicating these annotations are visually confirmed, on the display 340, on the basis of the information supplied from the annotation detection unit 261.

Figure 14:
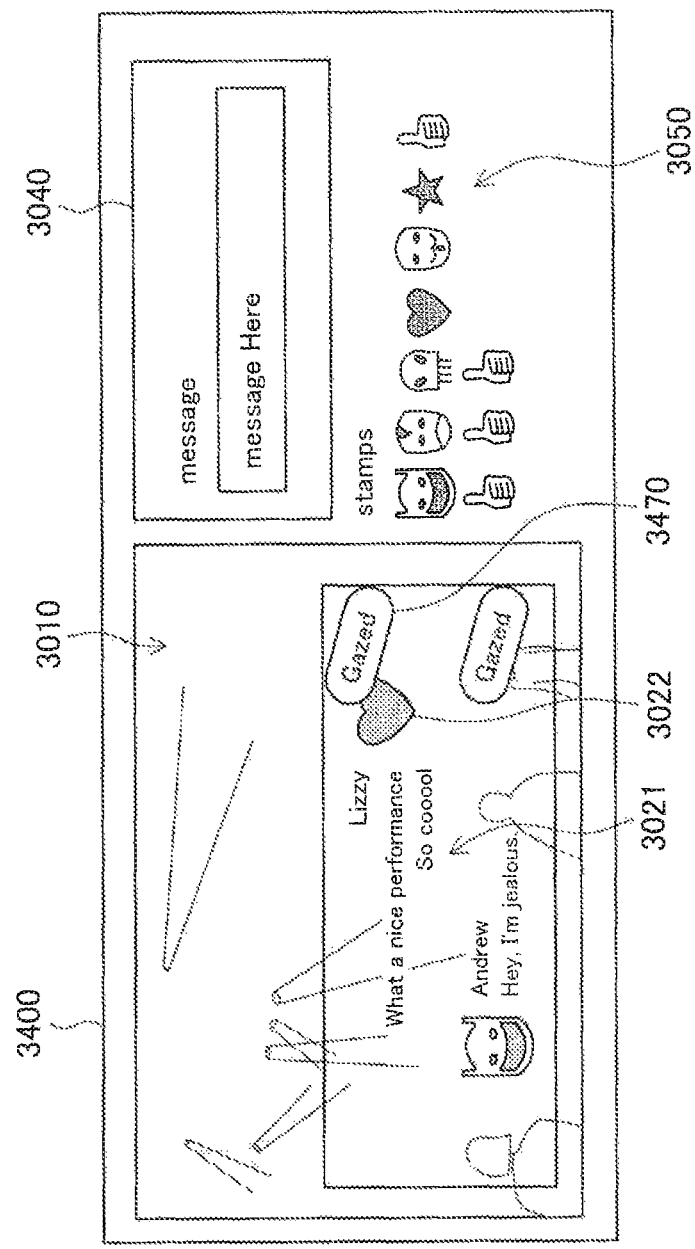
FIG. 14 is a diagram illustrating a first exemplary display in a tablet terminal in the fourth embodiment of the present disclosure.

FIG. 14 is a diagram illustrating a first exemplary display at the tablet terminal in the fourth embodiment of the present disclosure. Note that an exemplary display at the wearable display 100 is the same as the above first embodiment, and thus the description will be omitted. Referring to FIG. 14, in the screen image 3400 displayed on the display 340 of the tablet terminal 300, the same moving image 3010, text 3021, stamp 3022, text input box 3040, and stamp selection box 3050 as the screen image 3000 described with reference to FIG. 5 in the first embodiment, and a gaze icon 3470 are displayed.

The gaze icon 3470 is displayed with respect to the annotation detected by the annotation detection unit 261 in order to indicate that the annotation is gazed by the first user. With the gaze icon 3470 that is displayed, the second user that uses the tablet terminal 300 can know that the input annotation is displayed at the wearable display 100, and further that it is gazed by the first user.

Figure 15:
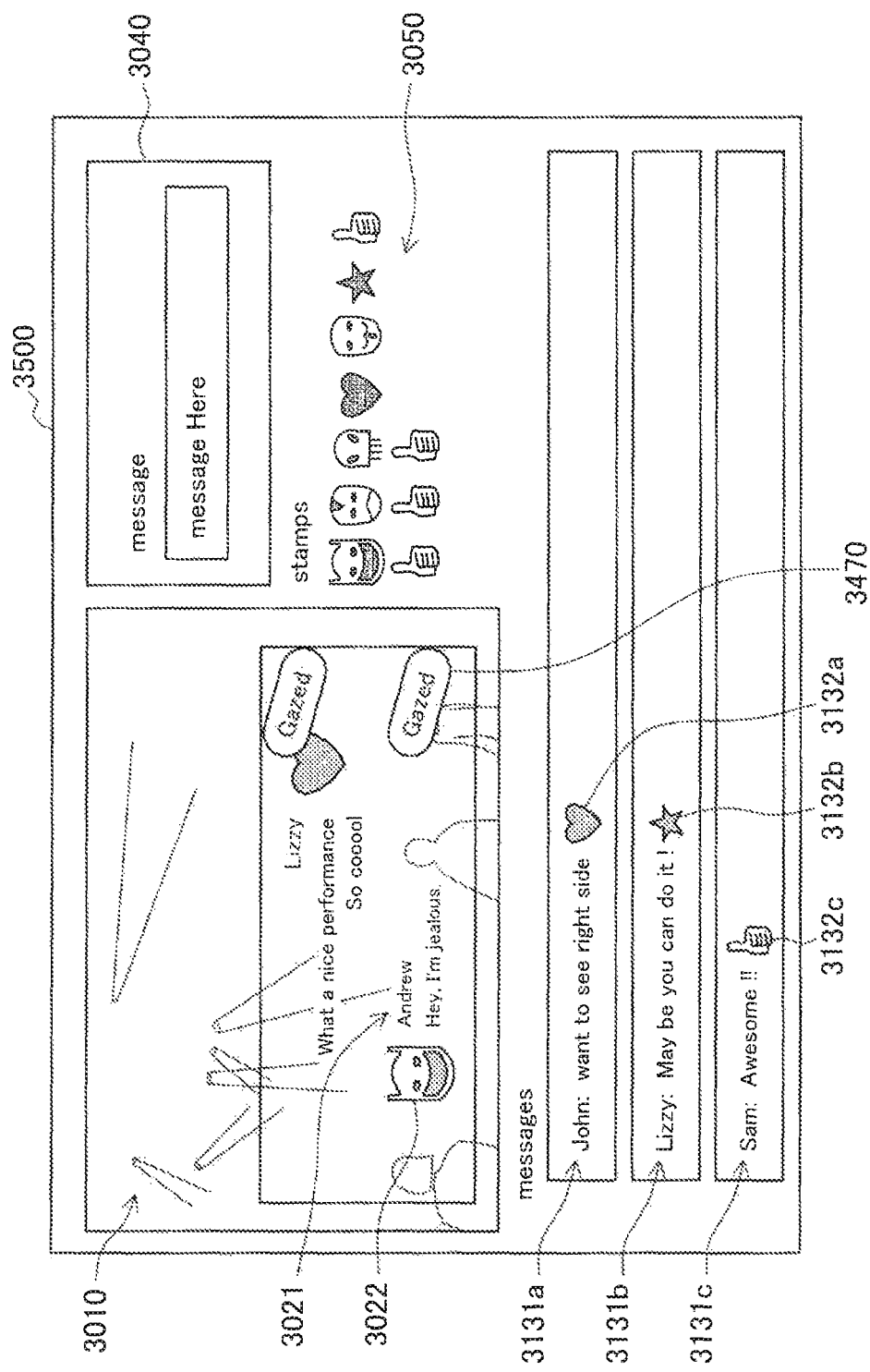
FIG. 15 is a diagram illustrating a second exemplary display in a tablet terminal in the fourth embodiment of the present disclosure.

FIG. 15 is a diagram illustrating a second exemplary display at the tablet terminal in the fourth embodiment of the present disclosure. Referring to FIG. 15, in the screen image 3500 displayed on the display 340 of the tablet terminal 300, the same moving image 3010, text 3021, stamp 3022, text input box 3040, stamp selection box 3050, and queued texts 3131 and stamps 3132 as the screen image 3100 described with reference to FIG. 9 in the second embodiment, and the same gaze icon 3470 as the above first example are displayed. As illustrated in this drawing, the gaze icon 3470 may be displayed together with the queued texts 3131 and stamps 3132.

5. Hardware Configuration

Figure 16:
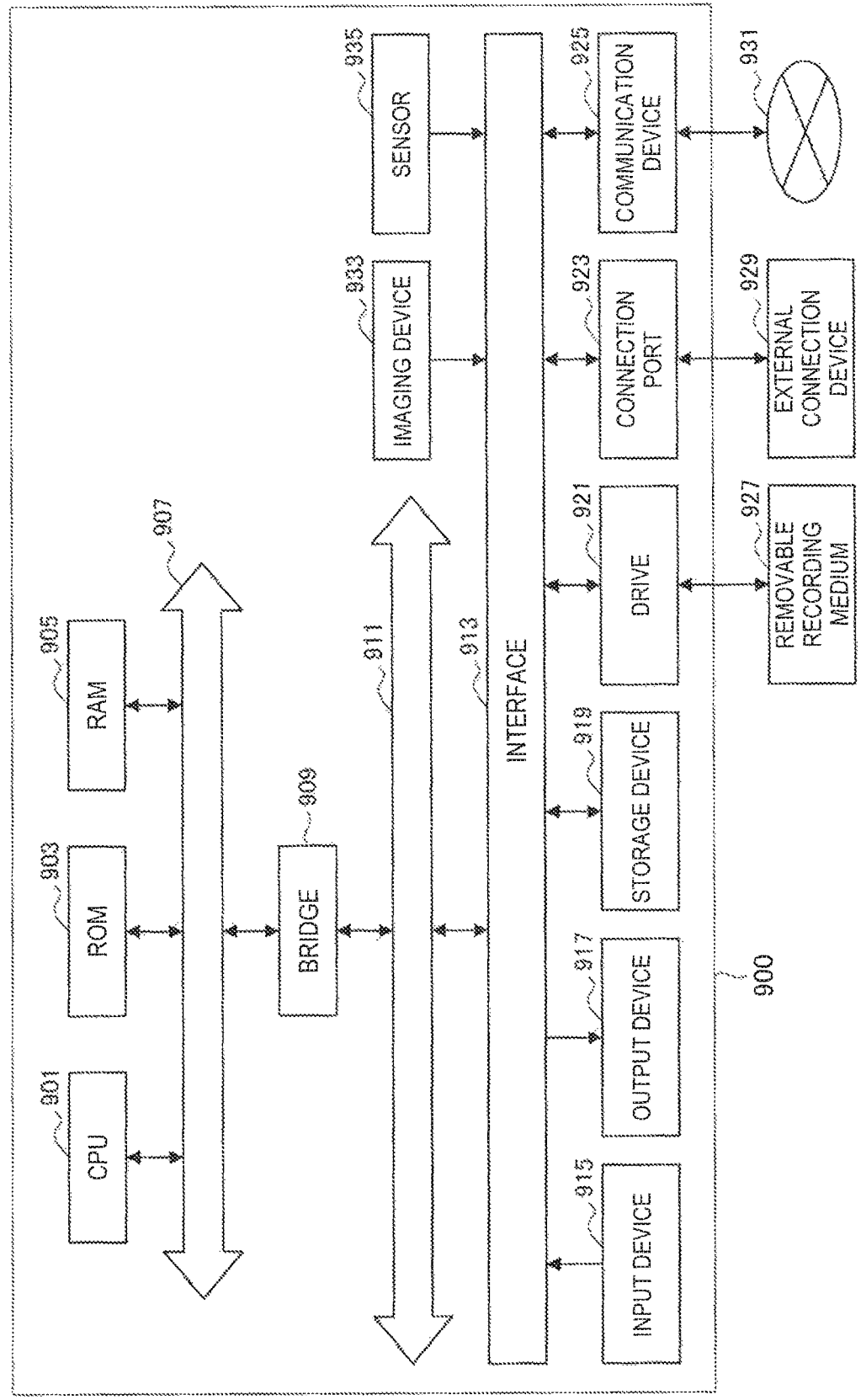
FIG. 16 is a block diagram for describing a hardware configuration that can configure an information processing apparatus according to an embodiment of the present disclosure.

Next, with reference to FIG. 16, a hardware configuration that is capable of realizing an information processing apparatus according to an embodiment of the present disclosure will be described. FIG. 8 is a block diagram showing a hardware configuration of an information processing apparatus. An information processing apparatus 900 which is shown may achieve the smartphone 150, the server 200, and the tablet terminal 300 in the above described embodiments, for example.

The information processing apparatus 900 includes a central processing unit (CPU) 901, read only memory (ROM) 903, and random access memory (RAM) 905. Further, the information processing apparatus 900 may also include a host bus 907, a bridge 909, an external bus 911, an interface 913, an input device 915, an output device 917, a storage device 919, a drive 921, a connection port 923, and a communication device 925. Furthermore, the information processing apparatus 900 may include an imaging device 933 and a sensor 935 as necessary. The information processing apparatus 900 may also include, instead of or along with the CPU 901, a processing circuit such as a digital signal processor (DSP) or an application specific integrated circuit (ASIC).

The CPU 901 functions as an arithmetic processing unit and a control unit and controls an entire operation or a part of the operation of the information processing apparatus 900 according to various programs recorded in the ROM 903, the RAM 905, the storage device 919, or a removable recording medium 927. The ROM 903 stores programs and arithmetic parameters used by the CPU 901. The RAM 905 primarily stores programs used in execution of the CPU 901 and parameters and the like varying as appropriate during the execution. The CPU 901, the ROM 903, and the RAM 905 are connected to each other via the host bus 907 configured from an internal bus such as a CPU bus or the like. In addition, the host bus 907 is connected to the external bus 911 such as a peripheral component interconnect/interface (PCI) bus via the bridge 909.

The input device 915 is a device operated by a user, such as a mouse, a keyboard, a touch panel, buttons, a switch, and a lever. Also, the input device 915 may be a remote control device using, for example, infrared light or other radio waves, or may be an external connection device 929 such as a cell phone compatible with the operation of the information processing apparatus 900. The input device 915 includes an input control circuit that generates an input signal on the basis of information input by the user and outputs the input signal to the CPU 901. The user inputs various kinds of data to the information processing apparatus 900 and instructs the information processing apparatus 900 to perform a processing operation by operating the input device 915.

The output device 917 is configured from a device capable of visually or aurally notifying the user of acquired information. For example, the output device 917 may be: a display device such as a liquid crystal display (LCD), a plasma display panel (PDP), or an organic electro-luminescence (EL) display; an audio output device such as a speaker or headphones; or a printer. The output device 917 outputs results obtained by the processing performed by the information processing apparatus 900 as video in the form of text or an image or as audio in the form of audio or sound.

The storage device 919 is a device for storing data configured as an example of a storage unit of the information processing apparatus 900. The storage device 919 is configured from, for example, a magnetic storage device such as a hard disk drive (HDD), a semiconductor storage device, an optical storage device, or a magneto-optical storage device. This storage device 919 stores programs to be executed by the CPU 901, various data, and various data obtained from the outside.

The drive 921 is a reader/writer for the removable recording medium 927 such as a magnetic disk, an optical disc, a magneto-optical disk, or a semiconductor memory, and is built in or externally attached to the information processing apparatus 900. The drive 921 reads out information recorded on the attached removable recording medium 927, and outputs the information to the RAM 905. Further, the drive 921 writes the record on the attached removable recording medium 927.

The connection port 923 is a port for allowing devices to directly connect to the information processing apparatus 900. Examples of the connection port 923 include a universal serial bus (USB) port, an IEEE1394 port, and a small computer system interface (SCSI) port. Other examples of the connection port 923 may include an RS-232C port, an optical audio terminal, and a high-definition multimedia interface (HDMI) port. The connection of the external connection device 929 to the connection port 923 may enable the various data exchange between the information processing apparatus 900 and the external connection device 929.

The communication device 925 is a communication interface configured from, for example, a communication device for establishing a connection to a communication network 931. The communication device 925 is, for example, a wired or wireless local area network (LAN), Bluetooth (registered trademark), a communication card for wireless USB (WUSB), or the like. Alternatively, the communication device 925 may be a router for optical communication, a router for asymmetric digital subscriber line (ADSL), a modem for various communications, or the like. The communication device 925 can transmit and receive signals and the like using a certain protocol such as TCP/IP on the Internet and with other communication devices, for example. The communication network 931 connected to the communication device 925 is configured from a network which is connected via wire or wirelessly and is, for example, the Internet, a home-use LAN, infrared communication, radio wave communication, and satellite communication.

The imaging device 933 is a device which images a real space by use of various members including an image sensor such as a charge coupled device (CCD) or a complementary metal oxide semiconductor (CMOS) and a lens for controlling image formation of a subject on the image sensor, and generates a pickup image. The imaging device 933 may image a still image or a moving image.

The sensor 935 is any of various sensors such as an acceleration sensor, a gyro sensor, a magnetic field sensor, an optical sensor, and a sound sensor. For example, the sensor 935 acquires information related to the state of the information processing apparatus 900 itself, such as the posture of the housing of the information processing apparatus 900, or information related to the peripheral environment of the information processing apparatus 900, such as the brightness or noise around the information processing apparatus 900. Further, the sensor 935 may include a global positioning system (GPS) sensor which measures the latitude, the longitude, and the altitude of the apparatus by receiving a GPS signal.

Heretofore, an example of the hardware configuration of the information processing apparatus 900 has been shown. Each of the structural elements described above may be configured using a general-purpose material, or may be configured from hardware dedicated to the function of each structural element. The configuration may be changed as appropriate according to the technical level at the time of carrying out embodiments.

6. Supplement

The embodiments of the present disclosure may include the information processing apparatus (a smartphone, a server or a tablet terminal), the system, the information processing method executed in the information processing apparatus or the system, the program for causing the information processing apparatus to function, and the non-transitory tangible media having the program recorded thereon, which have been described above, for example.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1)

A display control device including:

a picture image acquiring unit configured to acquire a moving image corresponding to a sight of a first user in real time;

a display control unit configured to display the moving image toward a second user different from the first user; and an annotation detection unit configured to detect that an annotation input by the second user with respect to the moving image is displayed in the sight of the first user or is output to be displayed, wherein the display control unit further displays the displayed or output annotation toward the second user.

(2)

The display control device according to (1), wherein the annotation detection unit further detects that the annotation is queued to be displayed or to be output, and the display control unit displays the queued annotation toward the second user.

(3)

The display control device according to (2), wherein the display control unit displays the displayed or output annotation and the queued annotation in forms that are different from each other.

(4)

The display control device according to any one of (1) to (3), further including:

an annotation output control unit configured to output the annotation at a predetermined rate to display the annotation in the sight of the first user, and queue the annotation that is input over the predetermined rate.

(5)

The display control device according to (4), further including:

an output rate setting unit configured to set the predetermined rate on the basis of an operation performed by the first user or sensing information of the first user.

(6)

The display control device according to (5), wherein the output rate setting unit sets the predetermined rate at 0 temporarily, on the basis of the sensing information of the first user.

(7)

The display control device according to (6), wherein the display control unit further displays a notification indicating that the predetermined rate is 0, toward the second user.

(8)

The display control device according to any one of (5) to (7), wherein the output rate setting unit sets the predetermined rate at a maximum value until an amount of the queued annotation becomes less than a predetermined threshold value, on the basis of the operation performed by the first user.

(9)

The display control device according to any one of (4) to (8), wherein the annotation output control unit deletes at least a part of the queued annotation on the basis of an operation performed by the second user.

(10)

The display control device according to any one of (1) to (9), wherein the annotation detection unit further detects that the displayed or output annotation is gazed by the first user, and the display control unit further displays a notification indicating that the displayed or output annotation is gazed, toward the second user.

(11)

The display control device according to any one of (1) to (10), wherein the display control unit displays the moving image into which the displayed or output annotation is integrated, toward the second user.

(12)

The display control device according to (11), wherein the display control unit executes a process for integrating the displayed or output annotation into the moving image.

(13)

The display control device according to (11), wherein the annotation detection unit is implemented by the picture image acquiring unit that acquires the moving image into which the displayed or output annotation is integrated.

(14)

A display control method including:

acquiring a moving image corresponding to a sight of a first user in real time;

displaying the moving image toward a second user different from the first user, detecting, by a processor, that an annotation input by the second user with respect to the moving image is displayed in the sight of the first user or is output to be displayed; and displaying the displayed or output annotation toward the second user.

(15)

A program for causing a computer to implement:

a function of acquiring a moving image corresponding to a sight of a first user in real time;

a function of displaying the moving image toward a second user different from the first user;

a function of detecting that an annotation input by the second user with respect to the moving image is displayed in the sight of the first user or is output to be displayed; and a function of displaying the displayed or output annotation toward the second user.

REFERENCE SIGNS LIST 10, 12, 20, 30, 40 system
100 wearable display
110 display
120 camera
140 sensor
145 eye camera 150 smartphone
160 processor
170 memory
200 server
210 processor
220 memory
251 picture image processing unit
253 picture image acquiring unit
255 display control unit
257 annotation output control unit
261 annotation detection unit
263 annotation queue
265 output rate setting unit
267 gaze detection unit
300 tablet terminal
310 processor
320 memory
340 display
350 touch panel

The invention claimed is:

1. A display control device comprising:
circuitry configured to:
acquire a moving image corresponding to a sight of a first user in real time;
initiate display of the moving image on a display toward a second user different from the first user;
detect that an annotation input by the second user with respect to the moving image is displayed in the sight of the first user or is output to be displayed;
initiate display of the displayed or output annotation on another display in the sight of the first user;
initiate display of the displayed or output annotation on the display toward the second user;
detect that the displayed or output annotation displayed on the another display is gazed by the first user;
initiate, on the display toward the second user, display of a notification indicating that the displayed or output annotation displayed on the another display is gazed by the first user;
output the annotation at a predetermined rate to display the annotation on the another display in the sight of the first user, and queue the annotation that is input over the predetermined rate; and
set the predetermined rate on the basis of an operation performed by the first user or sensing information of the first user.

2. The display control device according to claim 1, wherein the circuitry is further configured to:
detect that the annotation is queued to be displayed or to be output; and
initiate display of the queued annotation on the display toward the second user, the queued annotation and the displayed or output annotation being displayed concurrently on the display toward the second user.

3. The display control device according to claim 2, wherein the circuitry is further configured to:
initiate display of the displayed or output annotation on the display in a first form and display of the queued annotation on the display in a second form, the first form and the second form being different from each other.

4. The display control device according to claim 2, wherein the circuitry is further configured to:
initiate, on the display toward the second user, display of the displayed or output annotation integrated into the moving image; and
initiate, on the display toward the second user, display of the queued annotation on the display toward the second user outside the moving image.

5. The display control device according to claim 1, wherein the circuitry is further configured to:
set the predetermined rate at 0 temporarily, on the basis of the sensing information of the first user.

6. The display control device according to claim 5, wherein the circuitry is further configured to:
initiate, on the display toward the second user, display of a notification indicating that the predetermined rate is 0.

7. The display control device according to claim 1, wherein the circuitry is further configured to:
set the predetermined rate at a maximum value until an amount of the queued annotation becomes less than a predetermined threshold value, on the basis of the operation performed by the first user.

8. The display control device according to claim 1, wherein the circuitry is further configured to:
delete at least a part of the queued annotation on the basis of an operation performed by the second user.

9. The display control device according to claim 1, wherein the circuitry is further configured to:
initiate, on the display toward the second user, display of the notification indicating that the displayed or output annotation is gazed by the first user, based on detecting that the displayed or output annotation is gazed by the first user.

10. The display control device according to claim 1, wherein the circuitry is further configured to:
initiate, on the display toward the second user, display of the moving image into which the displayed or output annotation is integrated.

11. The display control device according to claim 10, wherein the circuitry is further configured to:
execute a process for integrating the displayed or output annotation into the moving image.

12. The display control device according to claim 1, wherein the circuitry is further configured to:
detect that the displayed or output annotation is gazed by the first user when a sight line of the first user is identical with a direction in which the displayed or output annotation is displayed on the another display.

13. The display control device according to claim 1, wherein the circuitry is configured to:
detect that a sight line of the first user is identical with a direction in which the displayed or output annotation is displayed on the another display; and
detect that the displayed or output annotation is gazed by the first user, based on detecting that the sight line of the first user is identical with the direction in which the displayed or output annotation is displayed on the another display.

14. A display control method comprising:
acquiring a moving image corresponding to a sight of a first user in real time;
displaying the moving image on a display toward a second user different from the first user;
detecting, by a processor, that an annotation input by the second user with respect to the moving image is displayed in the sight of the first user or is output to be displayed;
displaying the displayed or output annotation on another display in the sight of the first user;
displaying the displayed or output annotation on the display toward the second user;

detecting that the displayed or output annotation displayed on the another display is gazed by the first user;

displaying, on the display toward the second user, a notification indicating that the displayed or output annotation displayed on the another display is gazed by the first user;

outputting the annotation at a predetermined rate to display the annotation on the another display in the sight of the first user, and queue the annotation that is input over the predetermined rate; and setting the predetermined rate on the basis of an operation performed by the first user or sensing information of the first user.

15. A non-transitory computer-readable medium having embodied thereon a program, which when executed by a computer causes the computer to execute a method, the method comprising:

acquiring a moving image corresponding to a sight of a first user in real time;

displaying the moving image on a display toward a second user different from the first user;

detecting that an annotation input by the second user with respect to the moving image is displayed in the sight of the first user or is output to be displayed;

displaying the displayed or output annotation on another display in the sight of the first user;

displaying the displayed or output annotation on the display toward the second user;

detecting that the displayed or output annotation displayed on the another display is gazed by the first user;

displaying, on the display toward the second user, a notification indicating that the displayed or output annotation displayed on the another display is gazed by the first user;

outputting the annotation at a predetermined rate to display the annotation on the another display in the sight of the first user, and queue the annotation that is input over the predetermined rate; and setting the predetermined rate on the basis of an operation performed by the first user or sensing information of the first user.

* * * * *